(12) United States Patent
Kikuchi et al.

(10) Patent No.: US 12,270,975 B2
(45) Date of Patent: Apr. 8, 2025

(54) IMAGING OPTICAL SYSTEM AND IMAGING APPARATUS

(71) Applicant: SONY GROUP CORPORATION, Tokyo (JP)

(72) Inventors: Naomichi Kikuchi, Tokyo (JP); Miki Nakayama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 579 days.

(21) Appl. No.: 17/753,824

(22) PCT Filed: Aug. 5, 2020

(86) PCT No.: PCT/JP2020/030000
§ 371 (c)(1),
(2) Date: Mar. 16, 2022

(87) PCT Pub. No.: WO2021/059763
PCT Pub. Date: Apr. 1, 2021

(65) Prior Publication Data
US 2022/0346631 A1    Nov. 3, 2022

(30) Foreign Application Priority Data

Sep. 25, 2019  (JP) .................. 2019-174200

(51) Int. Cl.
*G02B 13/02* (2006.01)
*G02B 5/30* (2006.01)

(52) U.S. Cl.
CPC ........... *G02B 13/02* (2013.01); *G02B 5/3083* (2013.01)

(58) Field of Classification Search
CPC .............................. G02B 13/02; G02B 5/3083
(Continued)

(56) References Cited

U.S. PATENT DOCUMENTS

2009/0116096 A1    5/2009  Zalevsky et al.
2012/0281280 A1   11/2012  Buehler et al.
(Continued)

FOREIGN PATENT DOCUMENTS

CN      108697308 A    10/2018
EP      3662810 A1     6/2020
(Continued)

OTHER PUBLICATIONS

International Search Report and Written Opinion of PCT Application No. PCT/JP2020/030000, issued on Oct. 27, 2020, 09 pages of ISRWO.

*Primary Examiner* — Wyatt A Stoffa
*Assistant Examiner* — Mitchell T Oestreich
(74) *Attorney, Agent, or Firm* — CHIP LAW GROUP

(57) ABSTRACT

An imaging optical system according to the present disclosure includes: an aperture stop; an image-forming optical system that causes an image to be formed toward an imaging plane of an image sensor; and an optical phase modulator that includes a substance having a birefringence index, and gives two pupil functions to the image-forming optical system. The following conditional expressions are satisfied:

$$1 \leq (2 \times L \times \tan(w) + D)/D < 1.4 \quad (1)$$

$$\lambda/4 * 0.75 < Re < \lambda/4 * 1.1 \quad (2), \text{ where}$$

L: a distance between the aperture stop and the optical phase modulator; D: an aperture diameter (diameter) of the aperture stop; w: a maximum angle of incidence of a principal light ray that enters the aperture stop; λ: a wavelength of light; and Re: phase retardation caused by birefringence of the optical phase modulator.

18 Claims, 24 Drawing Sheets

(58) Field of Classification Search
USPC .......................................................... 359/366
See application file for complete search history.

(56) References Cited

U.S. PATENT DOCUMENTS

| | | |
|---|---|---|
| 2016/0291230 A1 | 10/2016 | Weichelt et al. |
| 2017/0184770 A1 | 6/2017 | Weichelt et al. |
| 2019/0328208 A1 | 10/2019 | Kashima et al. |
| 2019/0328209 A1 | 10/2019 | Springer et al. |

FOREIGN PATENT DOCUMENTS

| | | | |
|---|---|---|---|
| JP | 2006-053218 A | 2/2006 | |
| JP | 2010-271689 A | 12/2010 | |
| JP | 2015-005919 A | 1/2015 | |
| JP | 2017-158764 A | 9/2017 | |
| JP | 2018-101065 A | 6/2018 | |
| WO | 2007/122615 A2 | 11/2007 | |
| WO | 2017/154434 A1 | 9/2017 | |
| WO | WO-2018109117 A1 * | 6/2018 | ......... A61B 1/00009 |
| WO | WO-2019044328 A1 | 3/2019 | |

* cited by examiner

[FIG. 1]
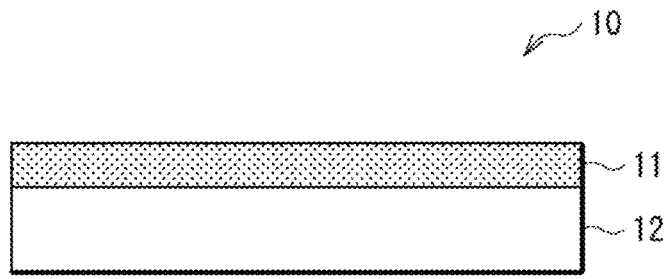
[FIG. 2]
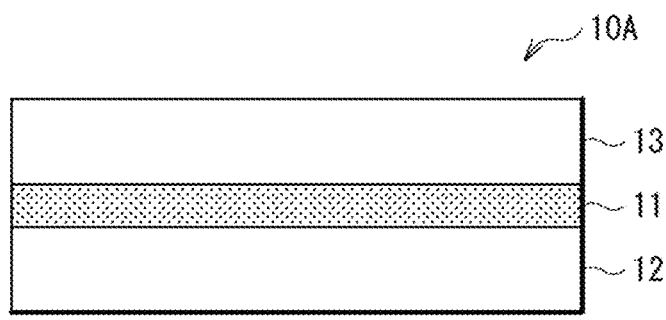
[FIG. 3]
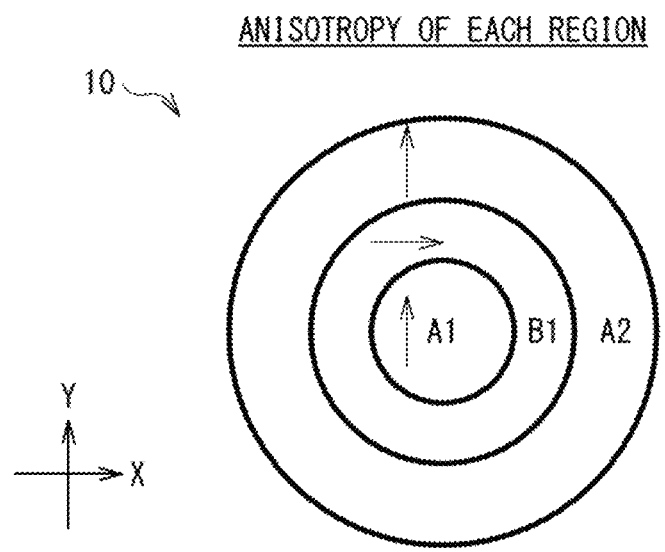

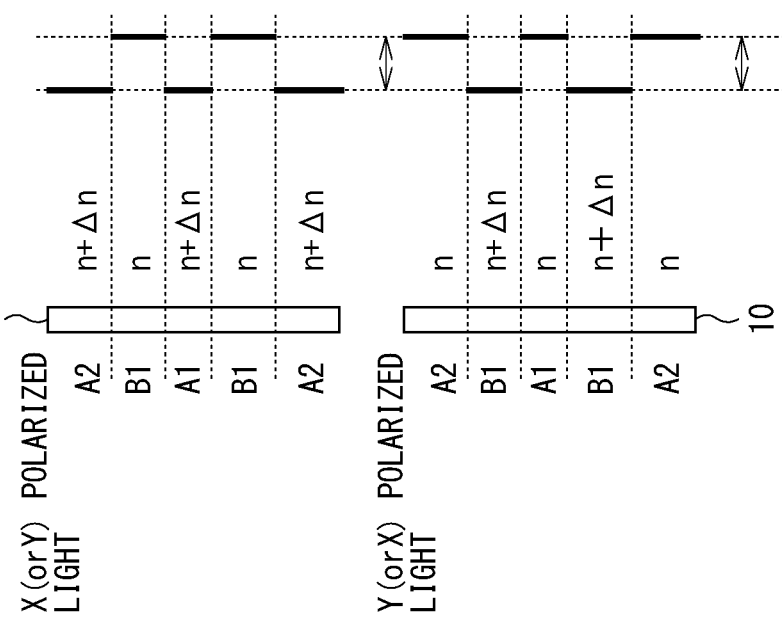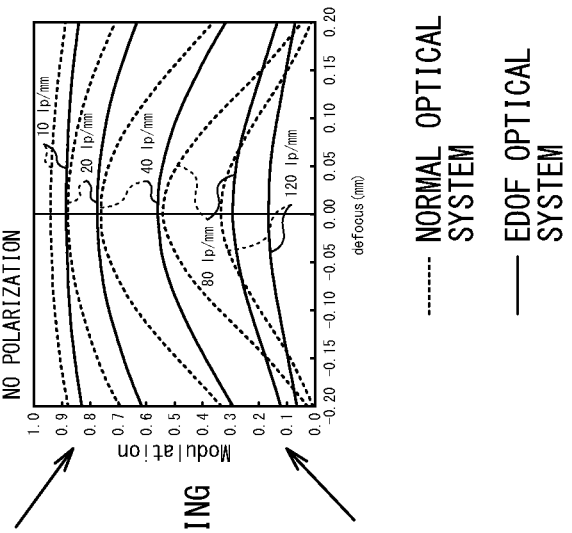

[FIG. 5]
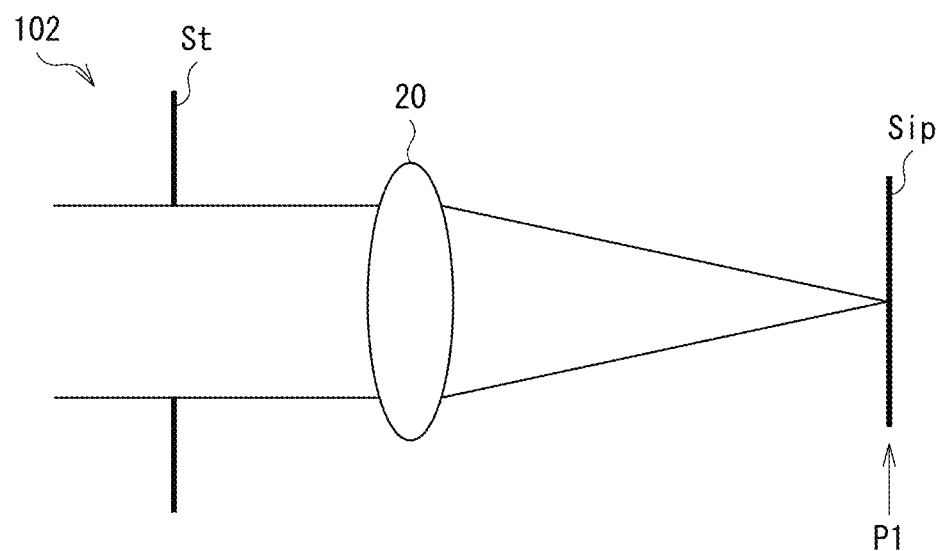

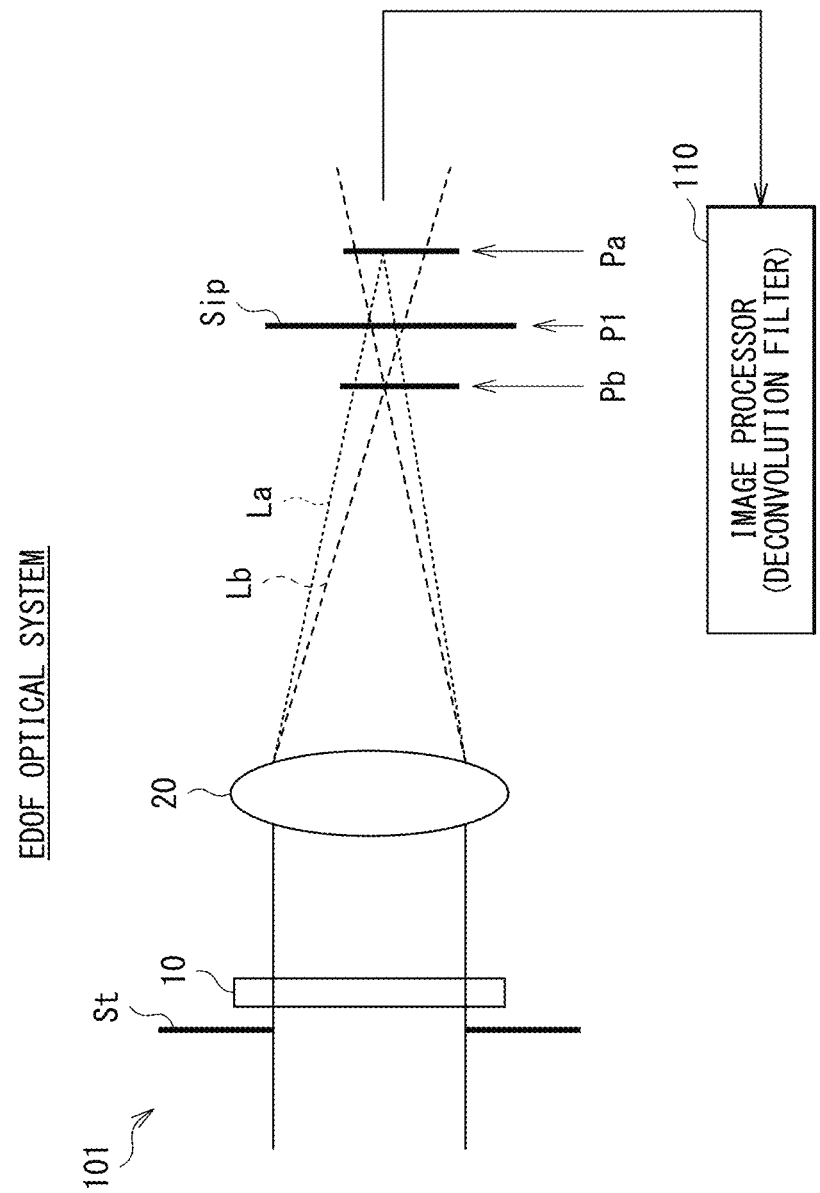
[FIG. 6]

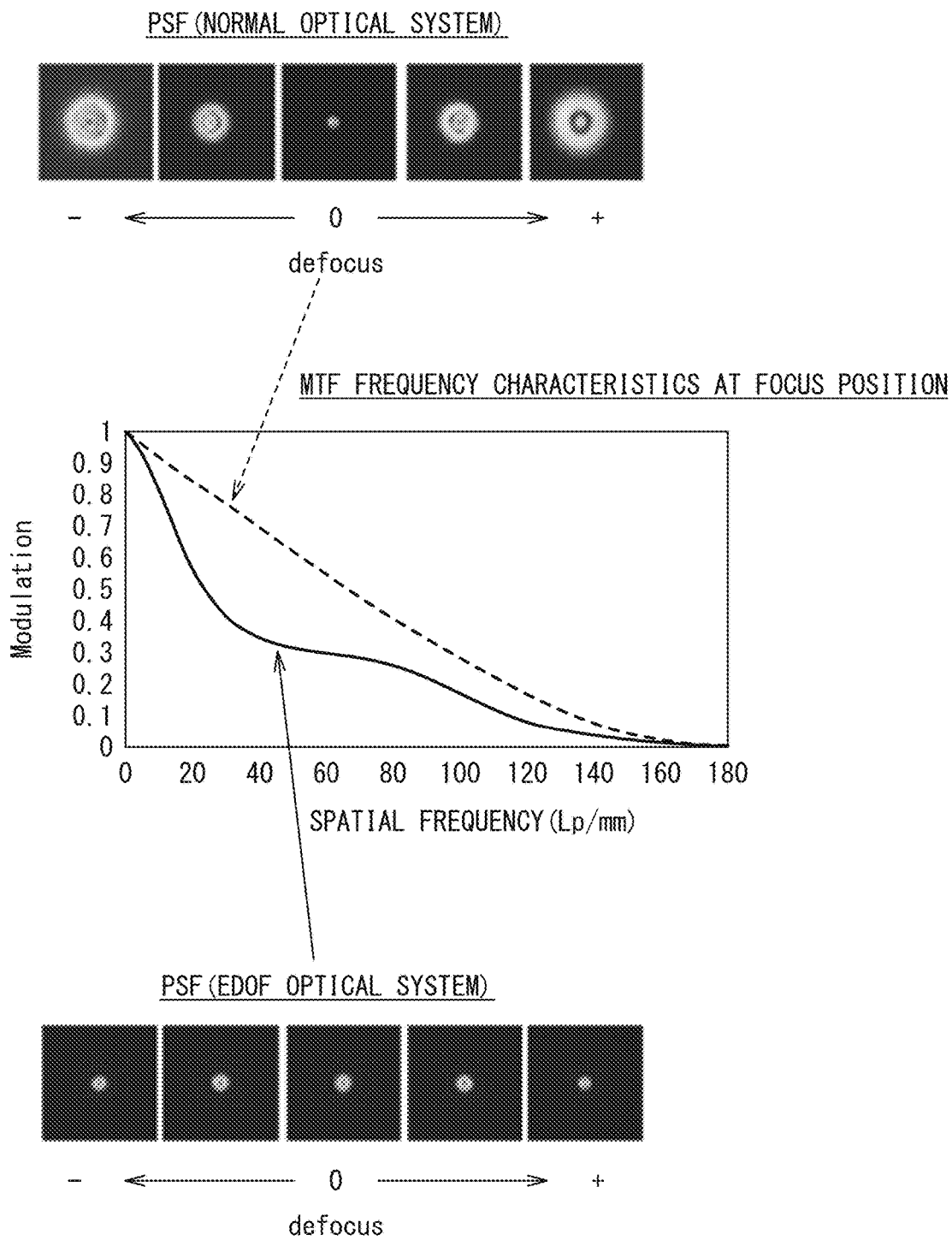
[FIG. 7]

THROUGH-FOCUS MTF
[FIG. 8A]  NORMAL OPTICAL SYSTEM
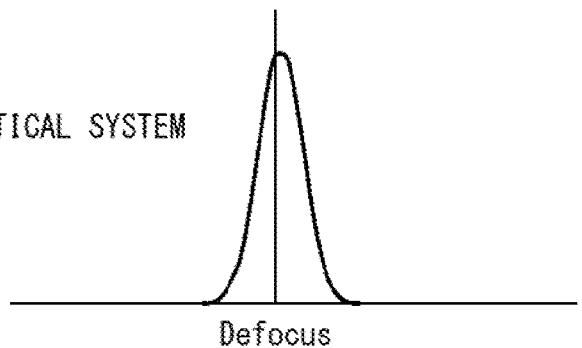
[FIG. 8B]  EDOF OPTICAL SYSTEM
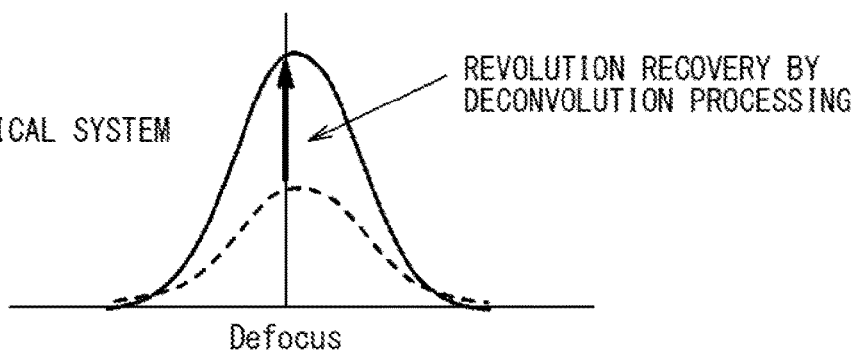

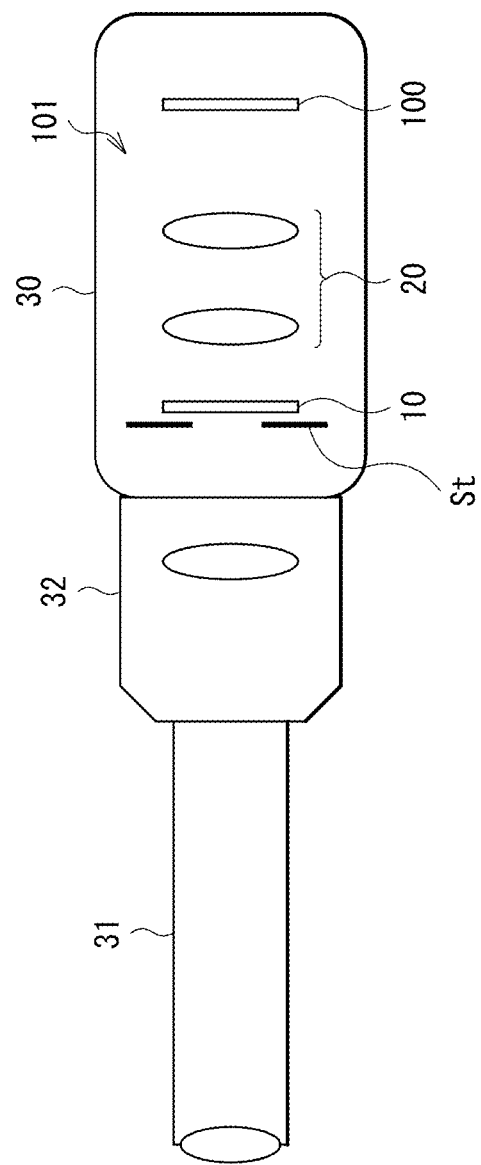
[FIG. 9]

[FIG. 10]
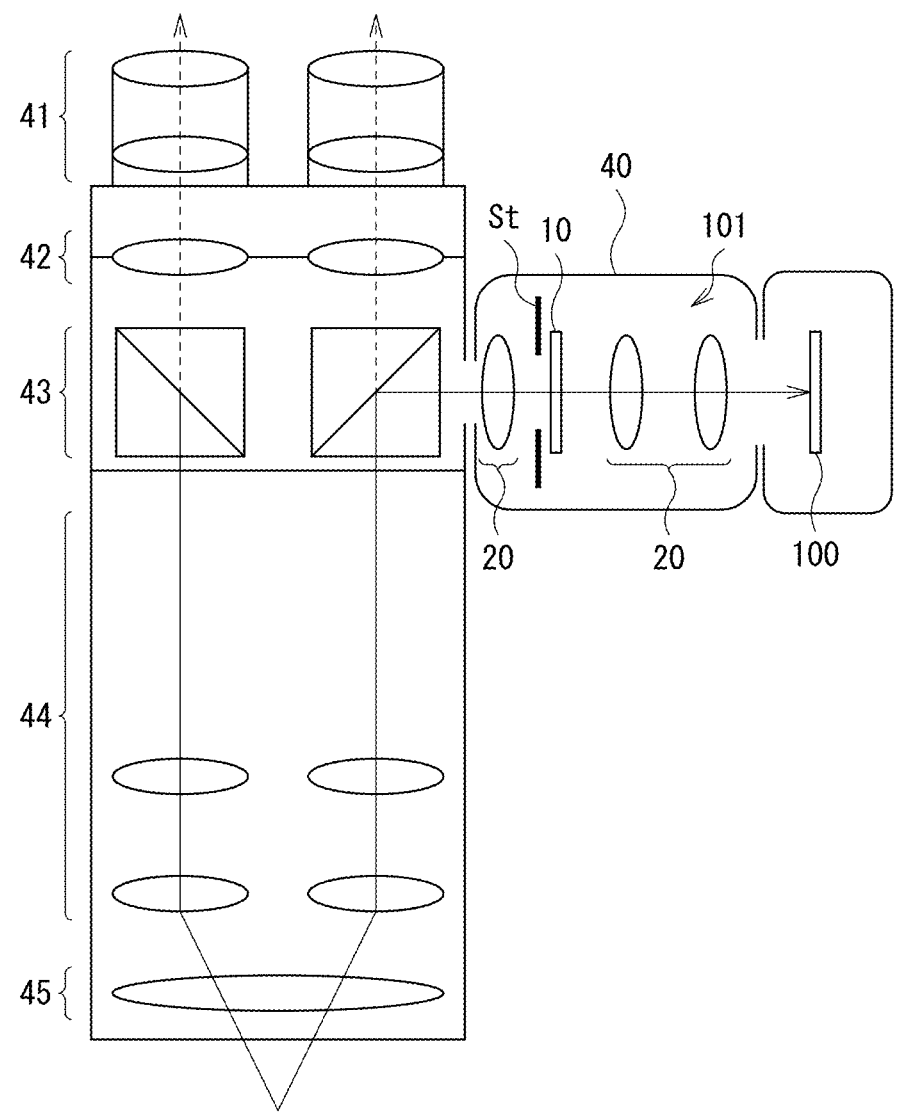

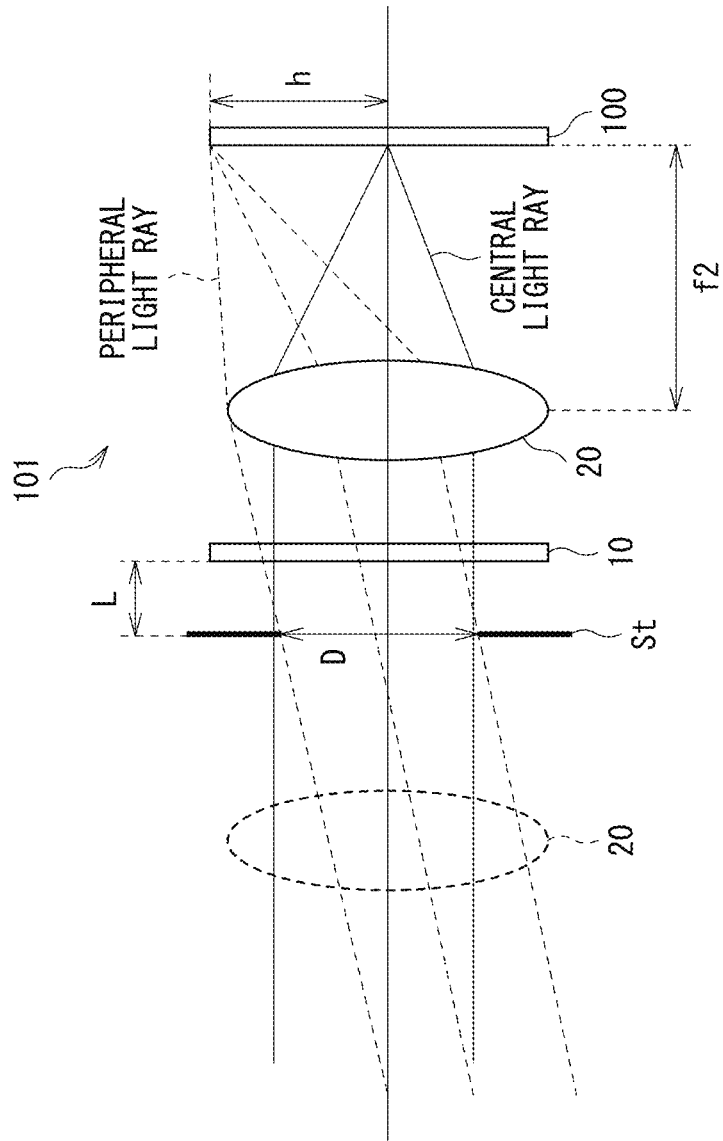
[FIG. 11]

[FIG. 12]
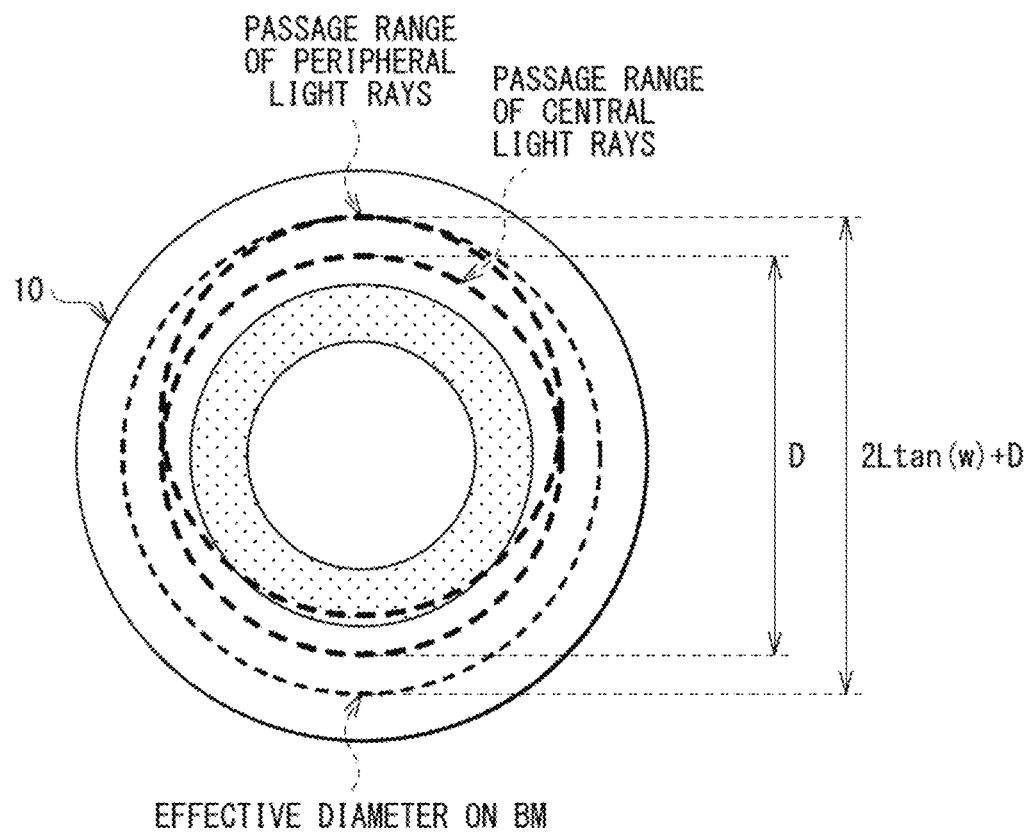

[FIG. 13]
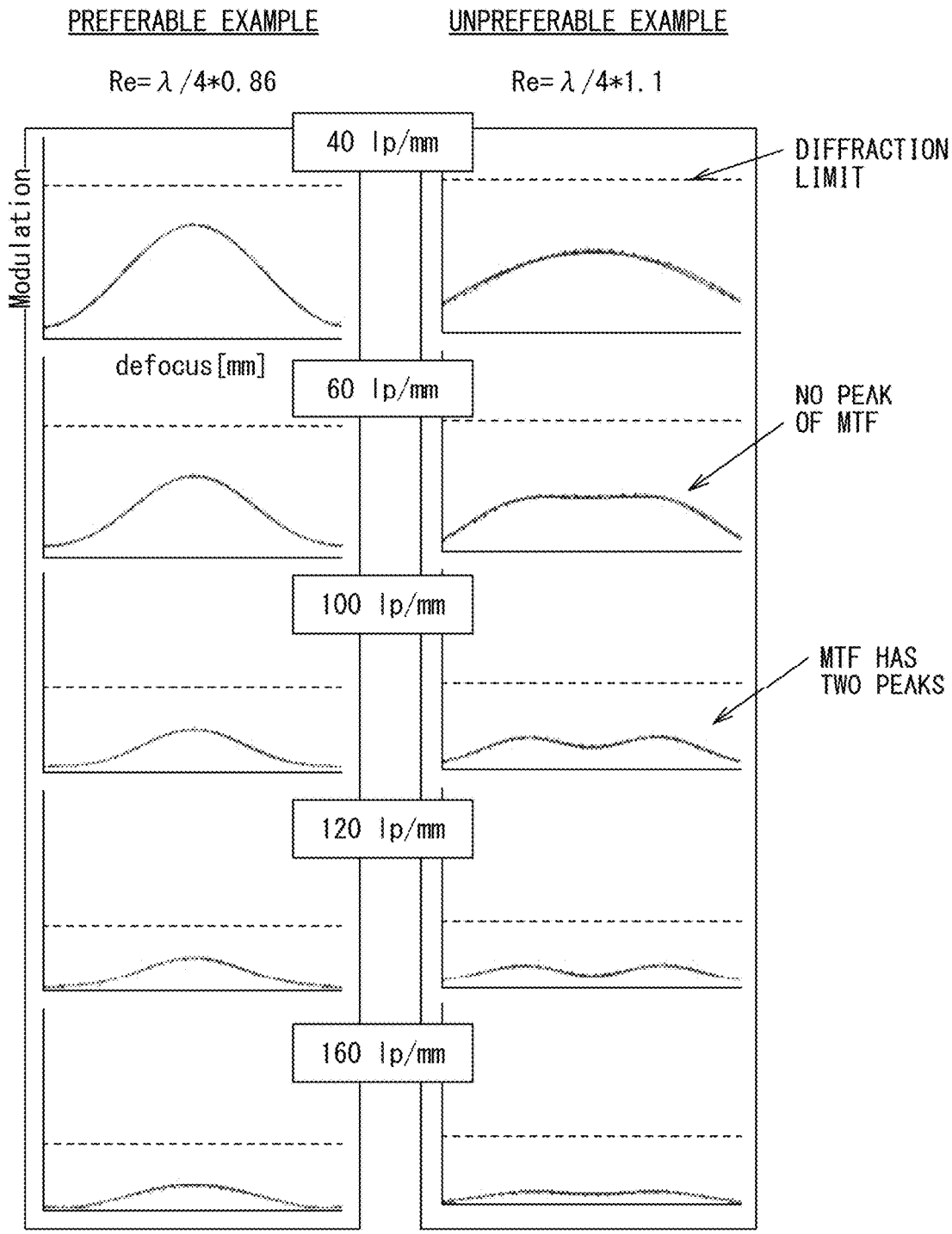

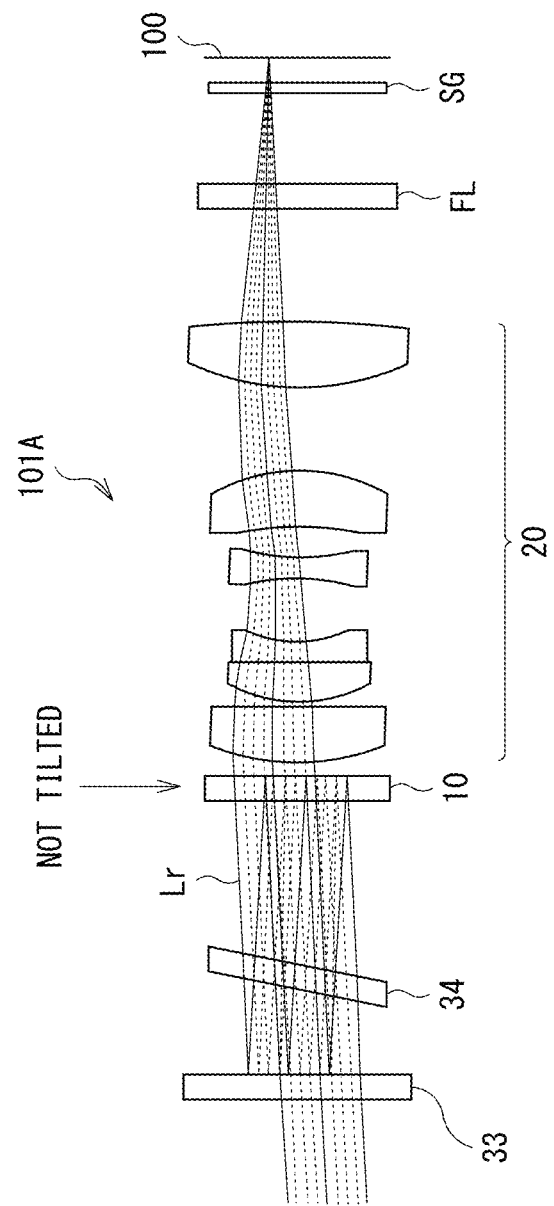
[FIG. 14]

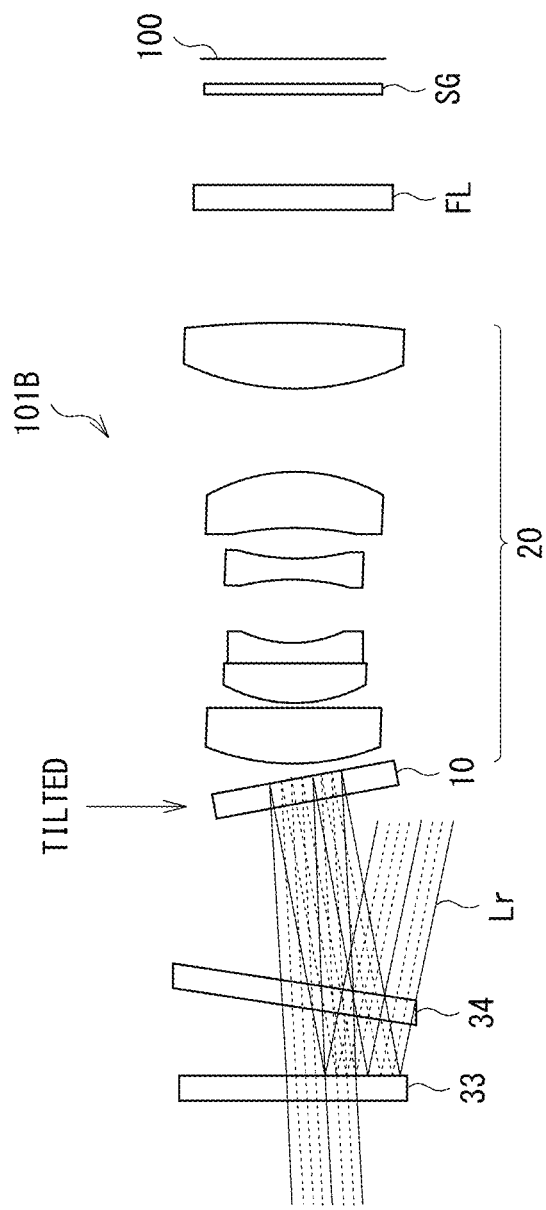
[FIG. 15]

[FIG. 16]
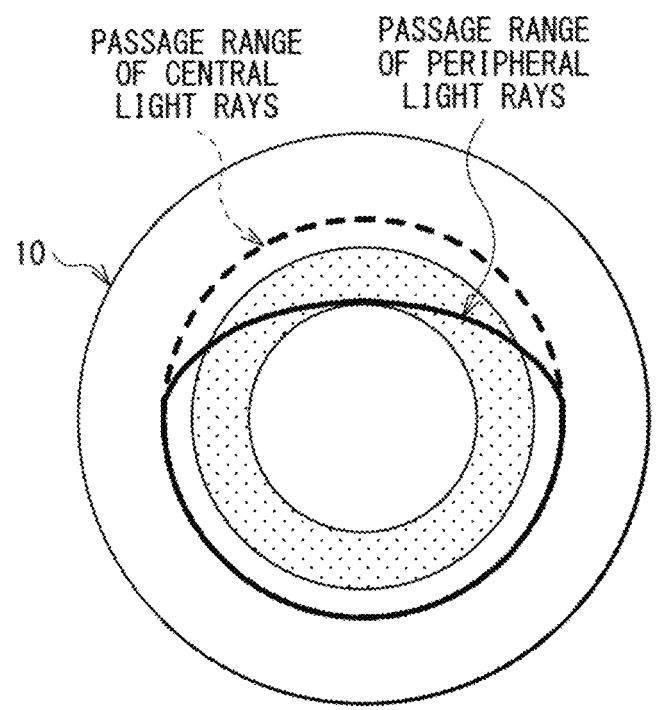

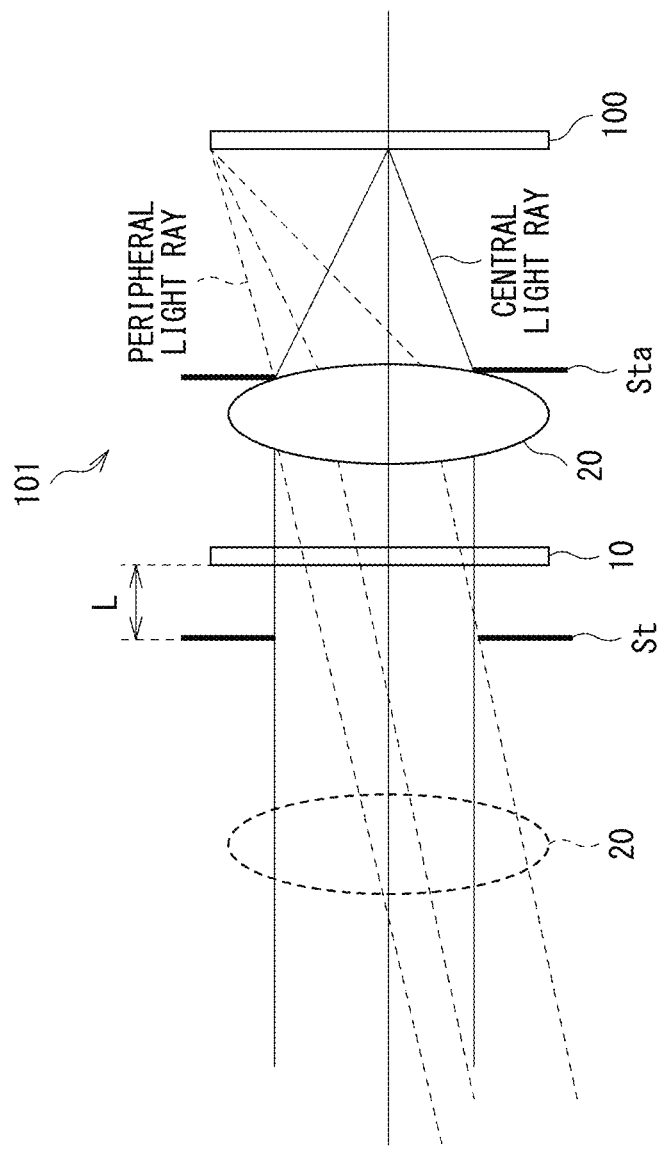
[FIG. 17]

[FIG. 18]
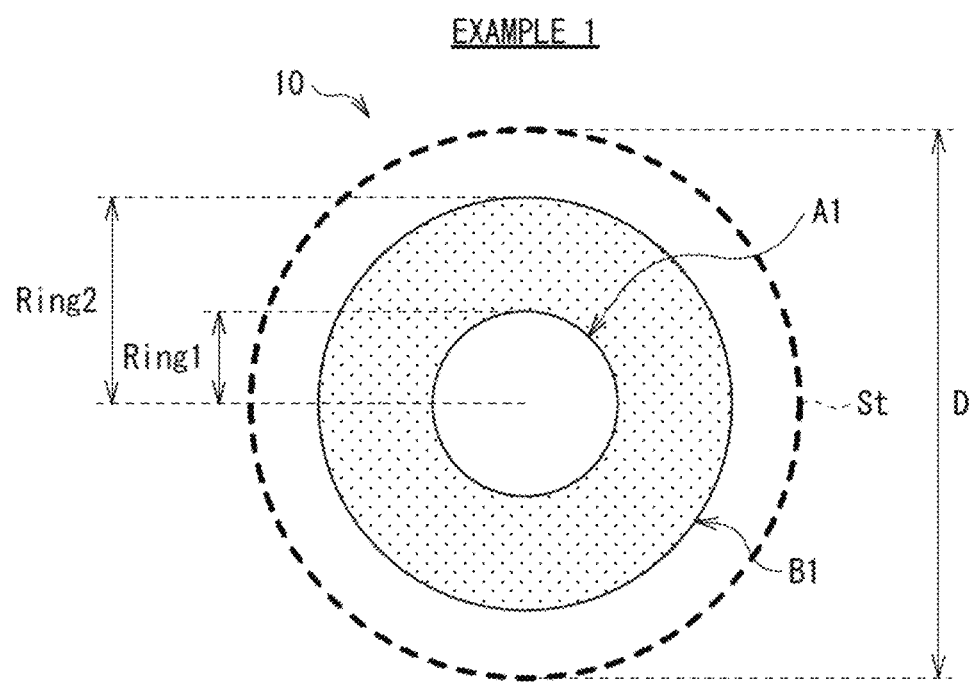

[FIG. 19]
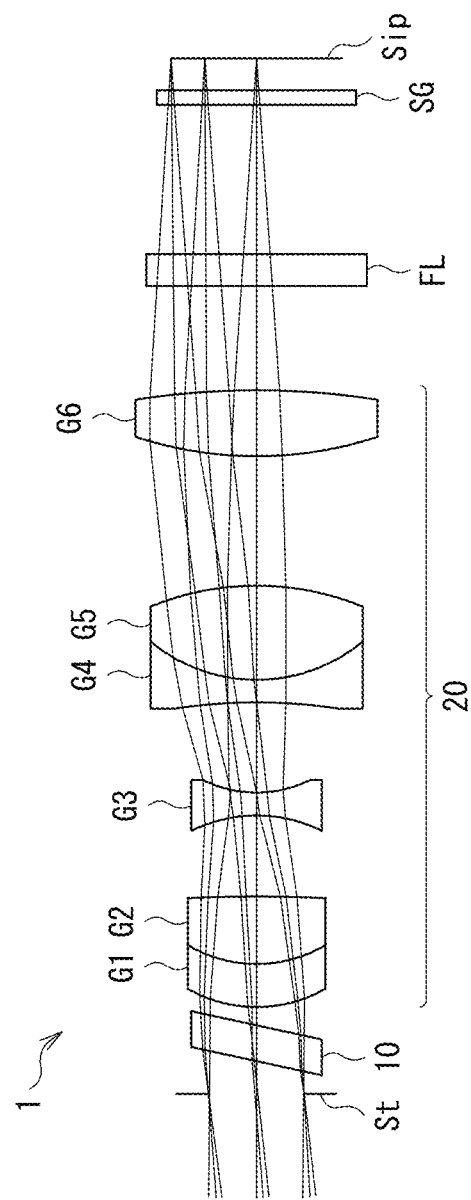
EXAMPLE 1

[FIG. 20]
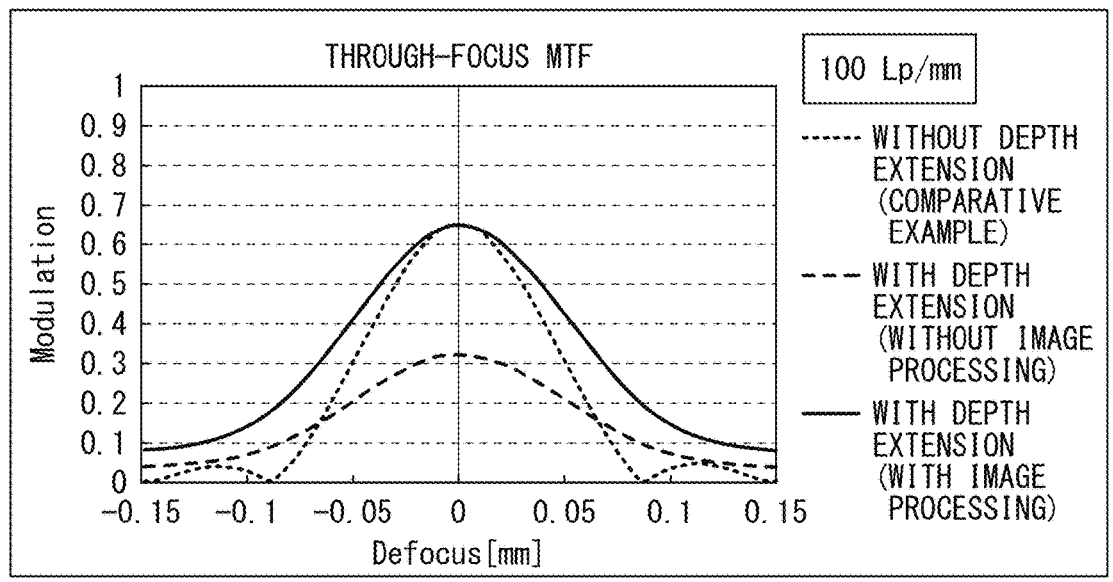
[FIG. 21]
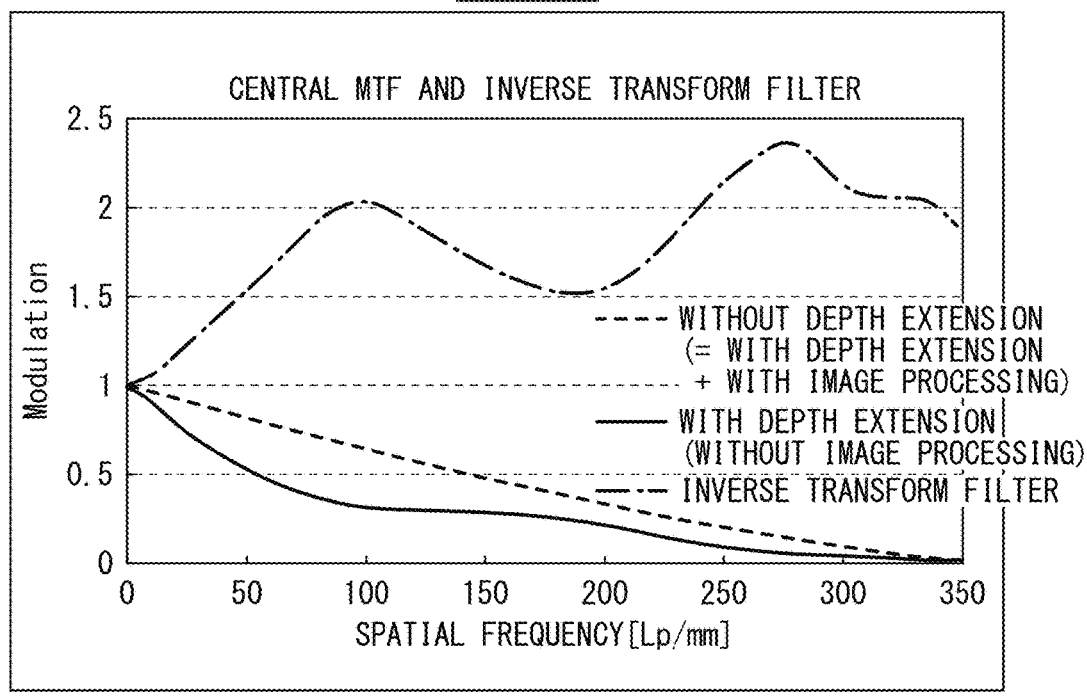

[FIG. 22]
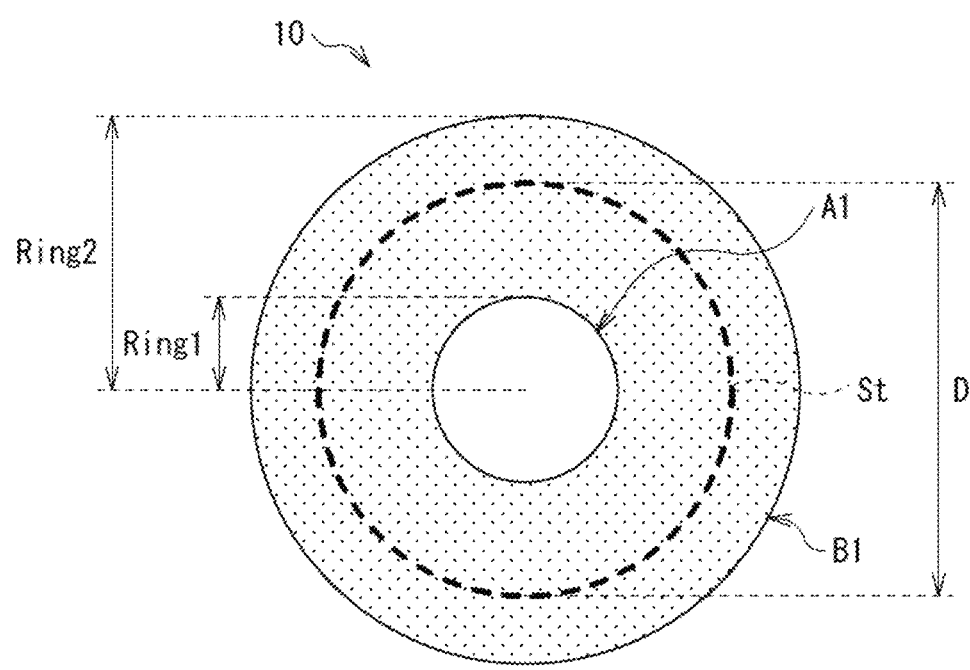

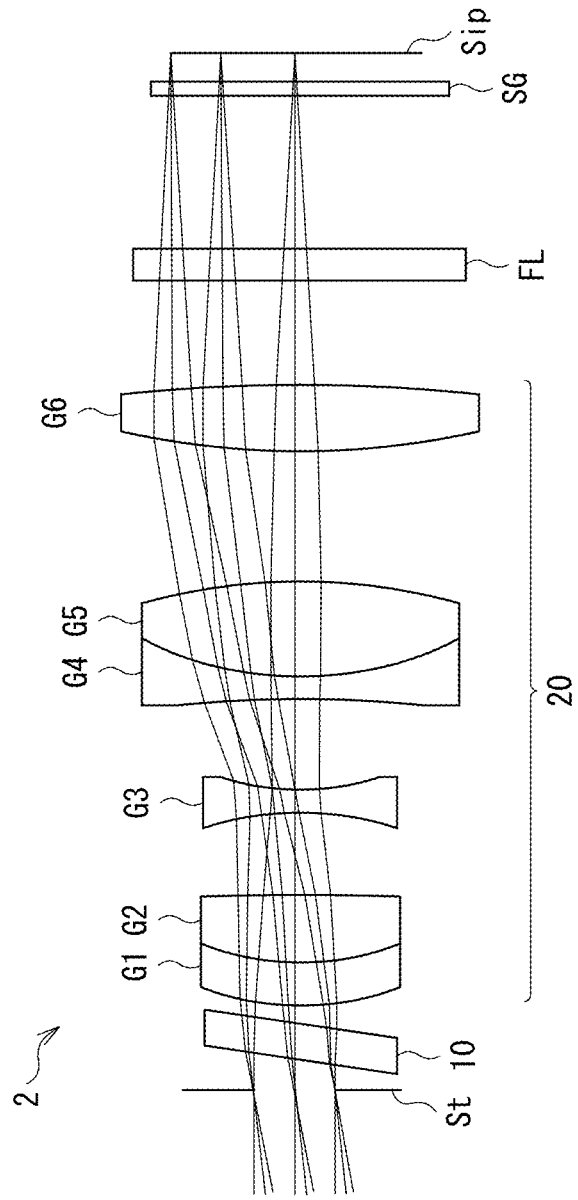
[FIG. 23]
EXAMPLE 2

[FIG. 24]
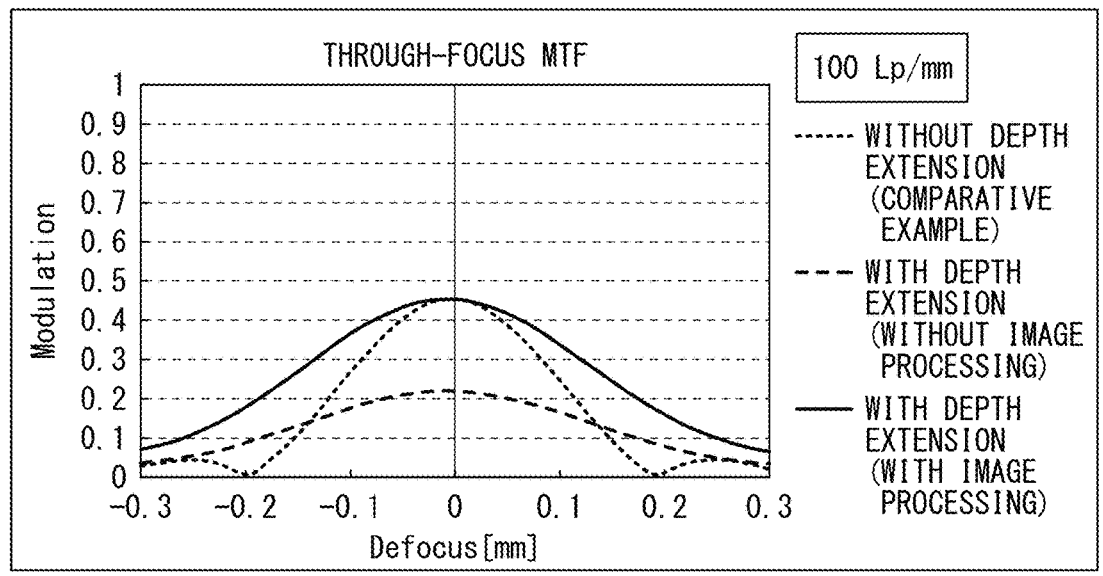
[FIG. 25]
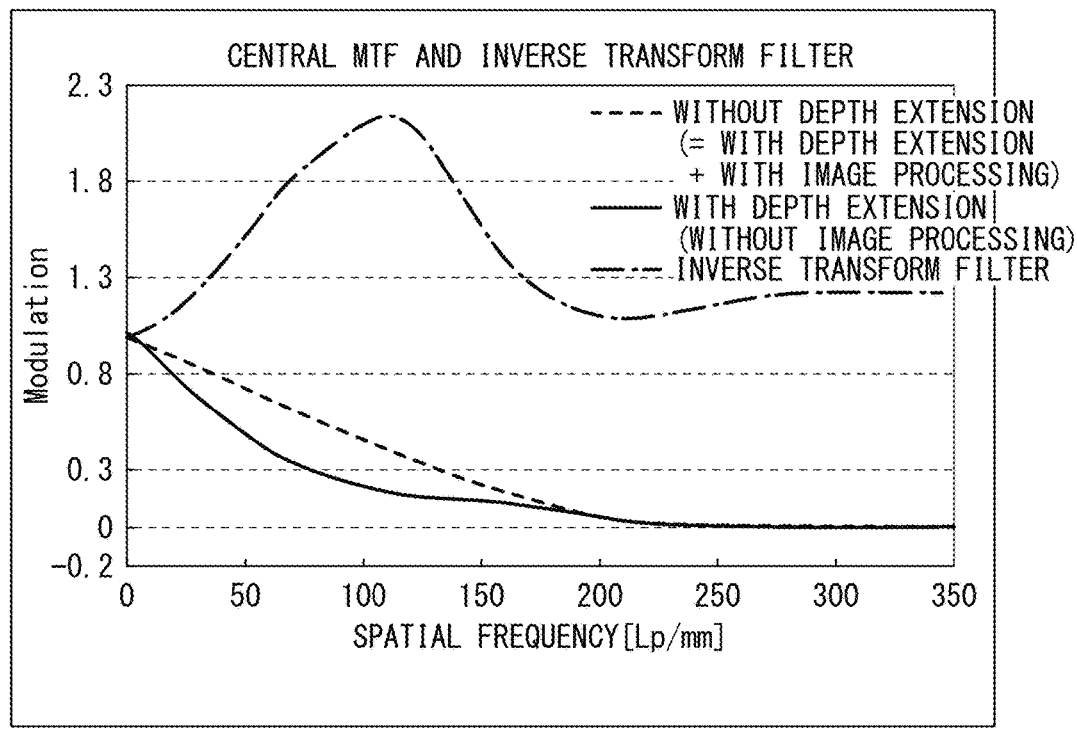

[FIG. 26]
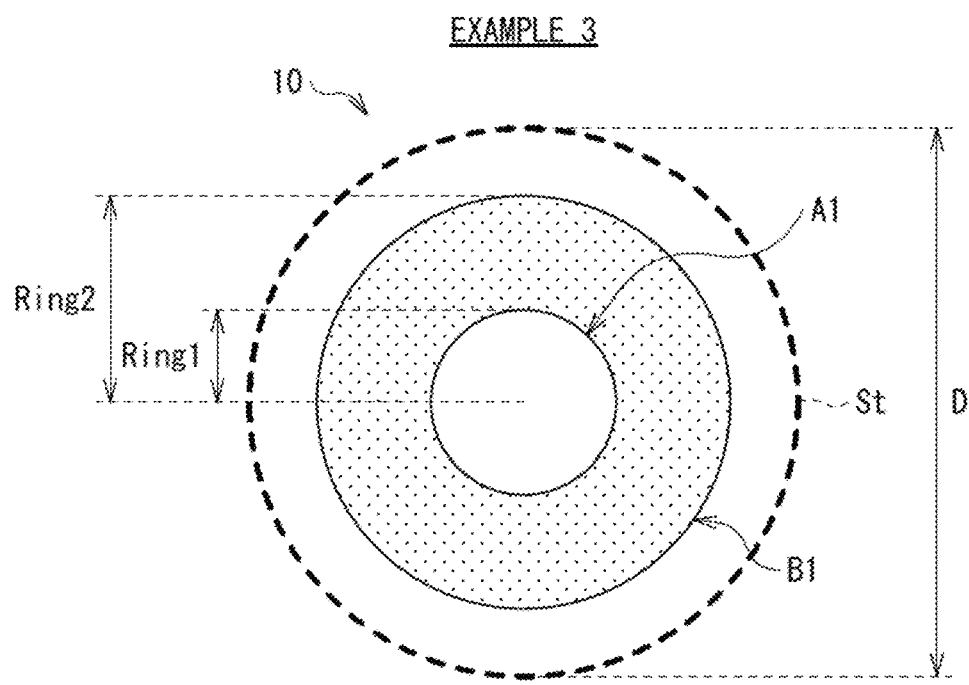

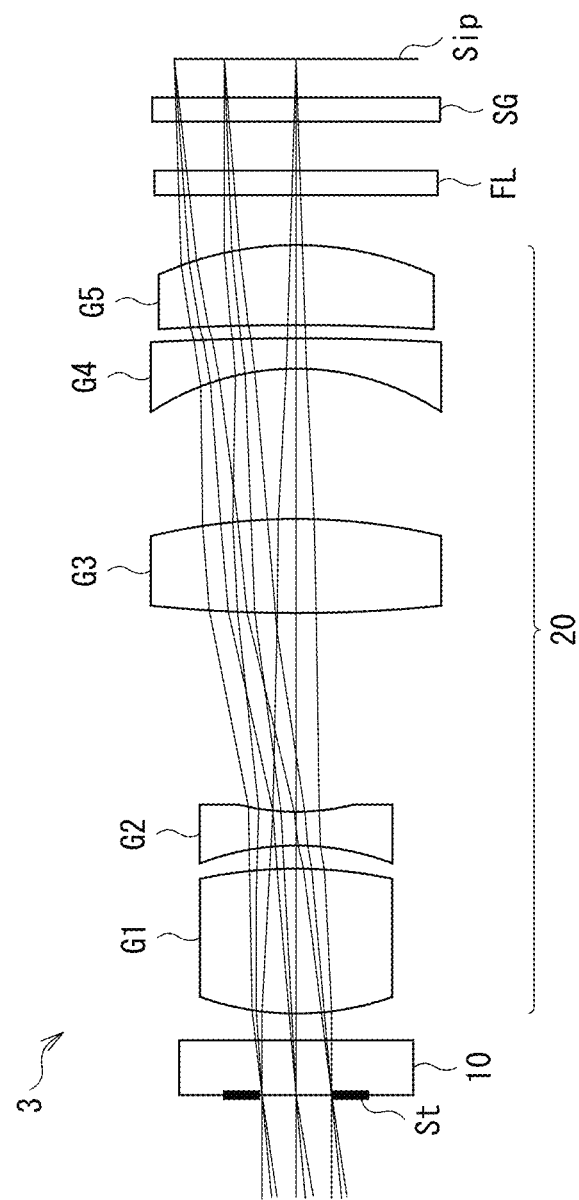
[FIG. 27]

[FIG. 28]
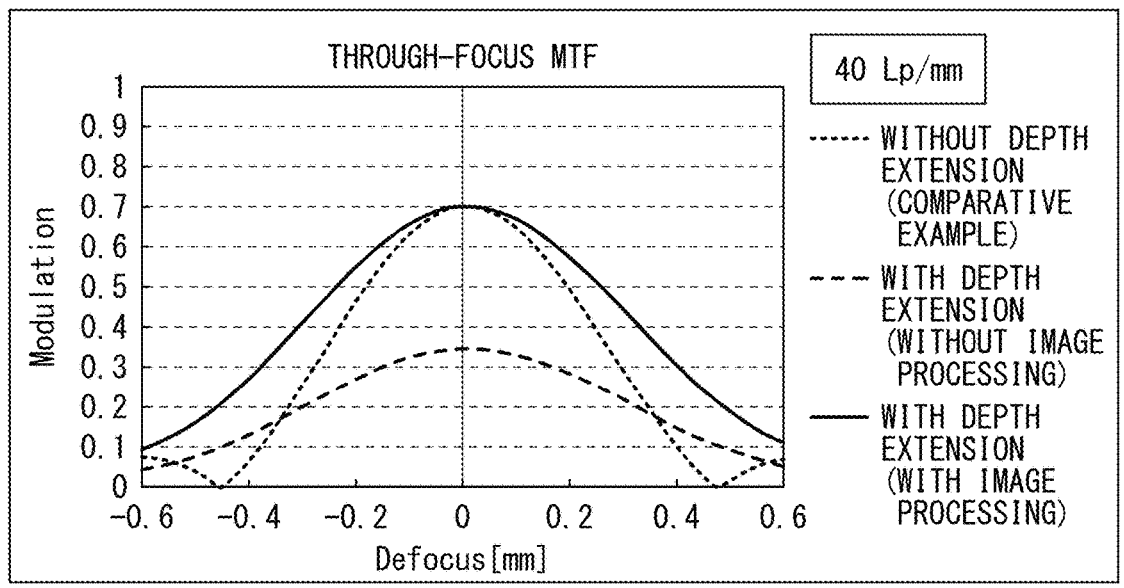
[FIG. 29]
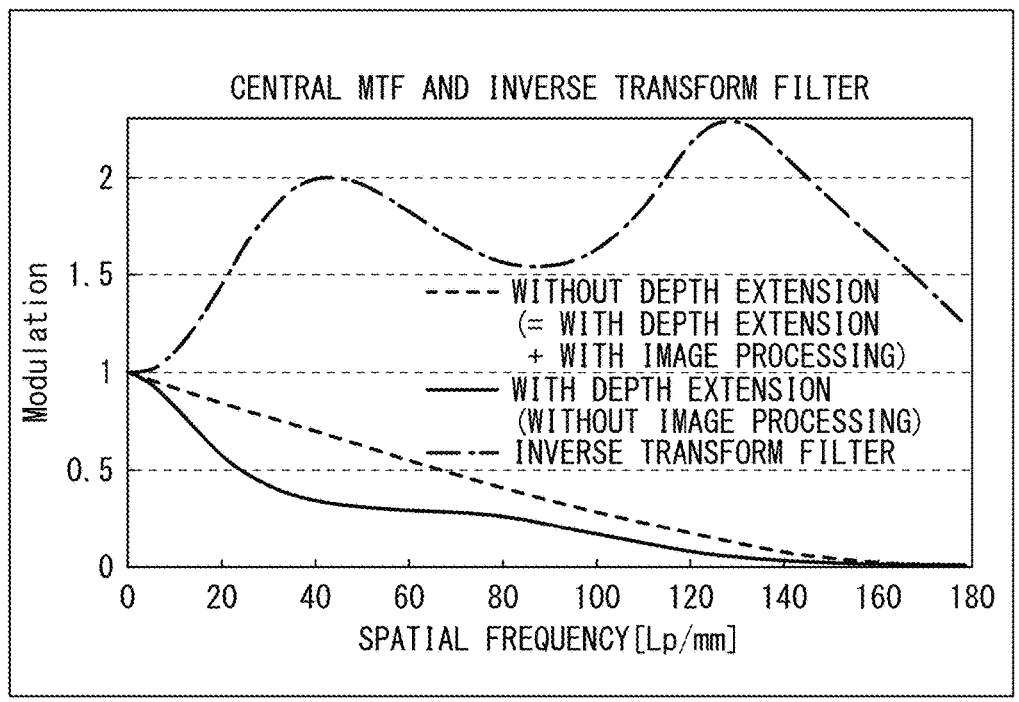

IMAGING OPTICAL SYSTEM AND IMAGING APPARATUS

CROSS REFERENCE TO RELATED APPLICATIONS

This application is a U.S. National Phase of International Patent Application No. PCT/JP2020/030000 filed on Aug. 5, 2020, which claims priority benefit of Japanese Patent Application No. JP 2019-174200 filed in the Japan Patent Office on Sep. 25, 2019. Each of the above-referenced applications is hereby incorporated herein by reference in its entirety.

TECHNICAL FIELD

The present disclosure relates to an imaging optical system and an imaging apparatus that make it possible to extend a depth of field.

BACKGROUND ART

Various techniques of extending a depth of field have been proposed (see PTLs 1 to 4).

CITATION LIST

Patent Literature

PTL 1: Japanese Unexamined Patent Application Publication No. 2015-5919
PTL 2: Japanese Unexamined Patent Application Publication No. 2018-101065
PTL 3: Japanese Unexamined Patent Application Publication No. 2010-271689
PTL 4: U.S. Unexamined Patent Application Publication No. 2012/0281280

SUMMARY OF THE INVENTION

Although medical imaging equipment, for example, is demanded to be increased in resolution, the increase in resolution can cause a decrease in a depth of field.

It is desirable to provide an imaging optical system and an imaging apparatus that make it possible to extend a depth of field while suppressing a decrease in resolution performance.

An imaging optical system according to one embodiment of the present disclosure includes: an aperture stop; an image-forming optical system that causes an image to be formed toward an imaging plane of an image sensor; and an optical phase modulator that includes a substance having a birefringence index, and gives two pupil functions to the image-forming optical system. The following conditional expressions are satisfied:

$$1 \leq (2 \times L \times \tan(w) + D)/D < 1.4 \quad (1)$$

$$\lambda/4 * 0.75 < Re < \lambda/4 * 1.1 \quad (2),$$

where $L$: a distance between the aperture stop and the optical phase modulator;
$D$: an aperture diameter (diameter) of the aperture stop;
$w$: a maximum angle of incidence of a principal light ray that enters the aperture stop;
$\lambda$: a wavelength of light; and
$Re$: phase retardation caused by birefringence of the optical phase modulator.

An imaging apparatus according to one embodiment of the present disclosure includes: an imaging optical system; and an image sensor disposed at an image formation position of the imaging optical system. The imaging optical system includes the above imaging optical system according to one embodiment of the present disclosure.

In the imaging optical system or the imaging apparatus according to one embodiment of the present disclosure, while the predetermined conditions are satisfied, the optical phase modulator gives the two pupil functions to the image-forming optical system. Thus, the imaging optical system or the imaging apparatus extends a depth of field while suppressing a decrease in resolution performance.

BRIEF DESCRIPTION OF DRAWINGS

FIG. 1 is a schematic cross-sectional view of a configuration example of a BM serving as an optical phase modulator in an imaging optical system according to one embodiment of the present disclosure.

FIG. 2 is a schematic cross-sectional view of another configuration example of the BM serving as an optical phase modulator in the imaging optical system according to one embodiment.

FIG. 3 is a schematic plan view of a configuration example of concentric pattern regions of the BM in the imaging optical system according to one embodiment.

FIGS. 4A, 4B, 4C, and 4D are explanatory diagrams schematically illustrating optical characteristics of the BM.

FIG. 5 is a schematic cross-sectional view of a configuration example of an imaging optical system (normal optical system) according to Comparative Example.

FIG. 6 is a schematic cross-sectional view of a configuration example of the imaging optical system (EDOF optical system) according to one embodiment.

FIG. 7 is an explanatory diagram illustrating, in comparison, optical characteristics of the imaging optical system according to Comparative Example and optical characteristics of the imaging optical system according to one embodiment.

FIGS. 8A and 8B are explanatory diagrams illustrating, in comparison, a through-focus MTF of the imaging optical system according to Comparative Example and a through-focus MTF of the imaging optical system according to one embodiment.

FIG. 9 is a schematic cross-sectional view of Application Example 1 of the imaging optical system according to one embodiment to an imaging apparatus.

FIG. 10 is a schematic cross-sectional view of Application Example 2 of the imaging optical system according to one embodiment to an imaging apparatus.

FIG. 11 is a cross-sectional view of an overview of central light rays and peripheral light rays that pass through the imaging optical system according to one embodiment.

FIG. 12 is an explanatory diagram illustrating an overview of a passage range of the central light rays and a passage range of the peripheral light rays in the BM of the imaging optical system according to one embodiment.

FIG. 13 is a characteristic diagram illustrating an example of the through-focus MTF for a plurality of spatial frequencies of the imaging optical system according to one embodiment.

FIG. 14 is an explanatory diagram illustrating an overview of occurrence of flare and ghost in the imaging optical system according to one embodiment.

FIG. 15 is an explanatory diagram illustrating a configuration example that suppresses occurrence of flare and ghost in the imaging optical system according to one embodiment.

FIG. 16 is an explanatory diagram illustrating an example of the passage range of the central light rays and the passage range of the peripheral light rays in the BM in a case where there is vignetting in the imaging optical system according to one embodiment.

FIG. 17 is a cross-sectional view of an example of the central light rays and the peripheral light rays in a case where there is vignetting in the imaging optical system according to one embodiment.

FIG. 18 is a schematic plan view of a configuration of the concentric pattern regions of the BM and a diameter of an aperture stop in an imaging optical system according to Example 1.

FIG. 19 is a cross-sectional view of an overall configuration of the imaging optical system according to Example 1.

FIG. 20 is a characteristic diagram illustrating the through-focus MTF of the imaging optical system according to Example 1.

FIG. 21 is a characteristic diagram illustrating frequency characteristics of the MTF at a focus position of the imaging optical system according to Example 1.

FIG. 22 is a schematic plan view of a configuration of the concentric pattern regions of the BM and a diameter of the aperture stop in an imaging optical system according to Example 2.

FIG. 23 is a cross-sectional view of an overall configuration of the imaging optical system according to Example 2.

FIG. 24 is a characteristic diagram illustrating the through-focus MTF of the imaging optical system according to Example 2.

FIG. 25 is a characteristic diagram illustrating frequency characteristics of the MTF at a focus position of the imaging optical system according to Example 2.

FIG. 26 is a schematic plan view of a configuration of the concentric pattern regions of the BM and a diameter of the aperture stop in an imaging optical system according to Example 3.

FIG. 27 is a cross-sectional view of an overall configuration of the imaging optical system according to Example 3.

FIG. 28 is a characteristic diagram illustrating the through-focus MTF of the imaging optical system according to Example 3.

FIG. 29 is a characteristic diagram illustrating frequency characteristics of the MTF at a focus position of the imaging optical system according to Example 3.

MODES FOR CARRYING OUT THE INVENTION

In the following, description is given of embodiments of the present disclosure in detail with reference to the drawings. It is to be noted that the description is given in the following order.

0. Comparative Examples
1. Overview of Imaging Optical System According to One Embodiment
2. Application Examples
3. Desirable Configuration Example
4. Effects
5. Numerical Examples
6. Other Embodiments

0. Comparative Examples

An increase in resolution is a great advantage for medical imaging equipment. One reason for this is that an increase in precision of surgery is expectable by becoming able to see tissues that have not been visible at typical resolutions, such as fine blood vessels, nerves, and lymph nodes. However, the increase in resolution can cause a decrease in a depth of field. Even a slight shift from a focus position causes blurred appearance. Shallowness of the depth of field thus gives stress to a surgeon. In addition, there is also a possibility of increasing burden of operations, such as increasing frequency of focus corrections. Examples of the medical imaging equipment include a surgical microscope, an endoscope, and a surgical field camera. These pieces of equipment are desired to achieve extension of a depth of field concurrently with an increase in resolution.

In general, a depth of field in an optical system is extendable by simply darkening a F-number. However, a drop in limiting resolution and a drop in an amount of light exert an influence on image quality itself, due to an increase in noise, etc. Hence, there have been demands for development of a depth extension optical system having image quality equivalent to that of a normal optical system not subjected to extension of a depth of field.

PTL 1 (Japanese Unexamined Patent Application Publication No. 2015-5919) proposes a technique of extending a depth of field by imparting spherical aberration to an image-forming optical system. However, this technique assumes a bright F-number as a precondition, and is effective only in a case where the limiting resolution of the image-forming optical system has a sufficient margin with respect to a Nyquist frequency of a sensor. An optical system to be used in medical imaging equipment has resolution performance that is close to a diffraction limit, because the F-number is dark. Causing the spherical aberration impairs the limiting resolution.

The techniques disclosed in PTL 2 (Japanese Unexamined Patent Application Publication No. 2018-101065) and PTL 3 (Japanese Unexamined Patent Application Publication No. 2010-271689) enable depth extension by using a WFC (Wave Front Coding) technique including a filter with a concavo-convex structure for optical phase modulation near an aperture stop of an optical system. However, in consideration of, for example, medical reliability demanding resistance to high-temperature sterilization, such a physical structure raises a concern for aged deterioration and is not suitable. In addition, AR (Anti Reflection) coating or the like is also difficult to apply, which presumably makes it difficult to take measures against flare and ghost.

PTL 4 (U.S. Unexamined Patent Application Publication No. 2012/0281280) proposes a phase modulator including a birefringence index substance, and proposes a technique of using this to enable depth extension as compared with a normal optical system. However, PTL 4 does not clearly illustrate a specific application range or an optimum design solution.

1. Overview of Imaging Optical System According to One Embodiment

An imaging optical system according to one embodiment includes an aperture stop, an image-forming optical system, and an optical phase modulator. The image-forming optical system causes an image to be formed toward an imaging plane of an image sensor. The optical phase modulator is an optical device that includes a substance having a birefringence index, and gives two pupil functions to the image-forming optical system, by applying respective different phase modulations to two pieces of polarized light in an orthogonal relationship.

FIG. 1 schematically illustrates a configuration example of the optical phase modulator in the imaging optical system according to one embodiment of the present disclosure. FIG. 2 schematically illustrates another configuration example of the optical phase modulator in the imaging optical system according to one embodiment.

The optical phase modulator in the imaging optical system according to one embodiment is, a depth extension device (BM: Birefringent Mask), and has an effect of extending a depth of field of the image-forming optical system. The imaging optical system according to one embodiment is an EDOF (Extended Depth of Focus) optical system having an extended depth of field by being equipped with the BM. The technique of the device itself of the BM is disclosed in PTL 4 described above, for example, as well. The technology according to the present disclosure is related to the WFC technique.

The BM is an optical device having no refractive power, and includes an optical device substrate and a birefringent layer formed on a surface of the optical device substrate. For example, like a BM 10 illustrated in FIG. 1, the BM includes a glass substrate 12, and a BM layer 11 serving as a birefringent layer formed on a surface of the glass substrate 12.

In addition, the BM may have a structure in which a birefringent layer is sandwiched between two optical device substrates like a sandwich. For example, like a BM 10A illustrated in FIG. 2, a structure in which the BM layer 11 serving as a birefringent layer is formed between two glass substrates 12 and 13 may be used. Using the sandwich-type structure makes it easy to apply AR coating or the like onto the glass substrate 13, for example, in the structure illustrated in FIG. 2, which reduces concerns for ghost and flare.

FIG. 3 schematically illustrates a configuration example of concentric pattern regions of the BM 10 in the imaging optical system according to one embodiment.

Unlike other optical phase modulators, the BM 10 does not have a structure like a concavo-convex shape for achievement of its effect. The BM layer 11 includes concentric pattern regions, as illustrated in FIG. 3, and has alignment in which a relative angle of birefringence anisotropy between the adjacent pattern regions is 90°. FIG. 3 illustrates an example in which, a first concentric pattern region A1, a second concentric pattern region B1, and a third concentric pattern region A2 are formed in order from the center. However, the number of concentric pattern regions is not limited to three, and two or four or more may be formed.

Optical characteristics of the BM 10 are described further with reference to FIGS. 4A, 4B, 4C, 4D, 5, and FIG. 6. FIGS. 4A, 4B, 4C, and 4D schematically illustrate the optical characteristics of the optical phase modulator (the BM 10). FIG. 5 schematically illustrates a configuration example of an imaging optical system according to Comparative Example (a normal optical system 102). FIG. 6 schematically illustrates a configuration example of the imaging optical system (EDOF optical system) 101 according to one embodiment.

The imaging optical system according to Comparative Example illustrated in FIG. 5 includes an aperture stop St and an image-forming optical system 20. The imaging optical system according to Comparative Example illustrated in FIG. 5 is the normal optical system 102 not including the BM 10 as a component.

The imaging optical system 101 according to one embodiment illustrated in FIG. 6 is, as compared with the configuration of the normal optical system 102, the EDOF optical system including the BM 10 near the aperture stop St. It is to be noted that, although FIG. 6 illustrates the configuration example in which the BM 10 is disposed on an imaging plane Sip side with respect to the aperture stop St, a configuration in which the BM 10 is disposed on an object side with respect to the aperture stop St may also be used. In addition, although FIG. 6 illustrates the configuration example in which the image-forming optical system 20 is disposed on the imaging plane Sip side with respect to the aperture stop St, some optical systems of the image-forming optical system 20 may be disposed on the object side with respect to the aperture stop St. An imaging apparatus equipped with such an imaging optical system 101 includes an image sensor disposed at a position of image formation by the imaging optical system 101, and an image processor 110 that performs, on an image captured by the image sensor, image processing using deconvolution derived from a PSF (Point Spread Function, point spread function) to be described later.

FIG. 4A illustrates an example of refractive indices applied to orthogonal two pieces of polarized light (X-polarized light and Y-polarized light) in the BM 10. FIG. 4B illustrates an example of phase modulation applied to each of the X-polarized light and the Y-polarized light by the BM 10. FIG. 4C illustrates, for each of the X-polarized light and the Y-polarized light, a through-focus MTF (Modulation transfer function) for a plurality of spatial frequencies. FIG. 4D illustrates, for each of the normal optical system 102 and the imaging optical system (EDOF optical system) 101 according to one embodiment, the through-focus MTF for the plurality of spatial frequencies.

For example, assume that, in the BM 10, the first concentric pattern region A1 and the third concentric pattern region A2 have alignment in a Y direction, and the second concentric pattern region B1 has alignment in a X direction, as illustrated in FIG. 3. In this case, as illustrated in FIG. 4A, in the first concentric pattern region A1 and the third concentric pattern region A2, a refractive index of n is applied to the Y-polarized light, whereas a refractive index of n+Δn is applied to the X-polarized light, because the BM 10 has a birefringence index. On the other hand, conversely in the second concentric pattern region B1, a refractive index of n+Δn is applied to the Y-polarized light, and a refractive index of n is applied to the X-polarized light.

This phenomenon causes refractive indices different between the first and third concentric pattern regions A1 and A2 and the second concentric pattern region B1 to be applied to each of the X-polarized light and the Y-polarized light. Therefore, as illustrated in FIG. 4B, a phase of transmitted light is shifted between the first and third concentric pattern regions A1 and A2 and the second concentric pattern region B1, in accordance with a distance when the light is transmitted through the BM 10 (a thickness of the BM 10). The phase shift (retardation) is expressed by a parameter of "(retardation)=Δn×(the thickness of the BM)". As a guide, the retardation is roughly about λ/4 with respect to a dominant wavelength Δ.

Light that has passed through the BM 10 has different wavefronts between the X-polarized light and the Y-polarized light, and is caused to form an image by the image-forming optical system 20. Because of having different wavefronts between the X-polarized light and the Y-polarized light, as illustrated in FIG. 6, a light ray Lb of the X-polarized light and a light ray La of the Y-polarized light respectively form images at positions Pb and Pa before and after an image formation position P1 of the normal optical system 102. The through-focus MTF of each of the X-polarized light and the Y-polarized light is as illustrated in FIG. 4C.

Image formation performance of the EDOF optical system as a whole is an average value of the X-polarized light and the Y-polarized light. The through-focus MTF obtained by averaging the through-focus MTF of each of the X-polarized light and the Y-polarized light in the EDOF optical system has a gentler shape than the through-focus MTF of the normal optical system 102, as illustrated in FIG. 4D. However, the peak MTF decreases, because the wavefront in the EDOF optical system is not an ideal wavefront. In addition, in the EDOF optical system, the X-polarized light and the Y-polarized light having respective conjugate and different wavefronts form images. Therefore, it is possible to say that the EDOF optical system equipped with the BM 10 "have two pupil functions".

Here, assuming that respective wavefront aberrations in a first polarization state (e.g., the X-polarized light) and a second polarization state (e.g., the Y-polarized light) given by the phase modulation of the BM 10 are expressed by $\Psi1(u, v)$ and $\Psi2(u, v)$, they are in the following conjugate relationship:

$$\Psi2(u,v) = -\Psi1(u,v).$$

The pupil functions P(u, v) of the EDOF optical system are given as follows in the first polarization state and the second polarization state.

$$P1(u,v) = |P(u,v)|\exp\{+i(\theta(u,v)+\Psi1(u,v))\}$$

$$P2(u,v) = |P(u,v)|\exp\{+i(\theta(u,v)-\Psi1(u,v))\}$$

u and v are coordinates in the X direction and the Y direction on a pupil, and $\theta(u, v)$ is the wavefront aberration of the image-forming optical system 20 in a state of not being equipped with the BM 10.

(Combination with Image Processing)

FIG. 7 illustrates, in comparison, optical characteristics of the imaging optical system according to Comparative Example (the normal optical system 102) and optical characteristics of the imaging optical system (EDOF optical system) 101 according to one embodiment. FIG. 7 illustrates, as the optical characteristics, an example of the PSF and frequency characteristics of the MTF. FIGS. 8A and 8B illustrates, in comparison, the through-focus MTF of the imaging optical system according to Comparative Example (the normal optical system 102) and the through-focus MTF of the imaging optical system (EDOF optical system) 101 according to one embodiment. FIG. 8A illustrates an example of the through-focus MTF of the imaging optical system according to Comparative Example (the normal optical system 102). FIG. 8B illustrates an example of the through-focus MTF of the imaging optical system (EDOF optical system) 101 according to one embodiment.

As illustrated in FIGS. 7, 8A and FIG. 8B, the MTF of the EDOF optical system has a lower peak value than that of the normal optical system 102. Therefore, in an imaging apparatus according to one embodiment, it is desirable to create a deconvolution filter (inverse transform filter) for image processing on the basis of the PSF of the EDOF optical system, and perform calculation processing using the deconvolution filter on an image captured via the EDOF optical system in the image processor 110 (FIG. 6). By performing this processing, it is possible to recover the MTF to the same level as that of the normal optical system 102, as illustrated in FIG. 8B. In addition, the BM 10 is able to keep the high-frequency MTF at 0 or more at a just focus position. Therefore, if deconvolution processing for resolution recovery is applied, it is possible to achieve a limiting resolution comparable to that of the normal optical system 102 at the just focus position, as illustrated in FIGS. 8A and 8B.

2. Application Examples

Described next are application examples of the imaging optical system 101 according to one embodiment to an imaging apparatus. It is to be noted that, in the following, substantially the same portions as the components of the imaging optical system 101 according to one embodiment described above are denoted with the same reference numerals, and description thereof is omitted as appropriate.

The imaging optical system 101 according to one embodiment is applicable to, for example, an endoscopic camera head of a rigid endoscope or the like, and a microscopic imaging camera unit. In addition, the imaging optical system 101 may be used as an optical system for capturing of an image formed by another afocal optical system or a substantially afocal optical system.

Application Example 1

FIG. 9 schematically illustrates Application Example 1 of the imaging optical system 101 according to one embodiment to an imaging apparatus. FIG. 9 illustrates a configuration example in which the imaging optical system 101 according to one embodiment is applied to an endoscopic camera head 30.

An endoscope 31 is, for example, a rigid endoscope or a fiber scope. An eyepiece 32 is attached to the endoscope 31.

The endoscopic camera head 30 is attached to the eyepiece 32. The endoscopic camera head 30 includes the imaging optical system 101 and an image sensor 100. An image captured by the image sensor 100 is subjected to image processing using deconvolution derived from the point spread function in the image processor 110 (FIG. 6).

Application Example 2

FIG. 10 schematically illustrates Application Example 2 of the imaging optical system 101 according to one embodiment to an imaging apparatus. FIG. 10 illustrates a configuration example in which the imaging optical system 101 according to one embodiment is applied to a surgical microscopic imaging camera unit 40.

A surgical microscope includes an eyepiece 41, an image-forming optical system 42, a prism 43, a zoom system 44, and an objective system 45. This surgical microscope enables observation by the naked eye via the eyepiece 41. The surgical microscopic imaging camera unit 40 is disposed on, for example, an optical path branched by the prism 43.

The surgical microscopic imaging camera unit 40 includes the imaging optical system 101 and the image sensor 100. The surgical microscopic imaging camera unit 40 is used to image an affected area via the surgical microscope. An image captured by the image sensor 100 is subjected to image processing using deconvolution derived from the point spread function in the image processor 110 (FIG. 6).

3. Desirable Configuration Example

Described below is a desirable configuration example of the imaging optical system 101 according to one embodiment.

(Position Where Installation is Allowed)

In the imaging optical system 101 according to one embodiment, it is desirable to dispose, on the aperture stop St, a surface of the BM 10 to which the phase modulation is applied. However, due to various factors such as a measure against ghost and a mechanical structure of the aperture stop St, it is difficult to dispose the BM 10 at an ideal position. A position where the BM 10 is allowed to be disposed is defined, for example, by a conditional expression (1), on the basis of an angle of incidence of a light ray on the aperture stop St.

$$1 \le (2 \times L \times \tan(w) + D)/D < 1.4 \quad (1), \text{where}$$

L: a distance between the aperture stop St and the optical phase modulator (the BM 10);
D: an aperture diameter (diameter) of the aperture stop St; and
w: a maximum angle of incidence of a principal light ray that enters the aperture stop St.

FIG. 11 illustrates an overview of the central light rays and the peripheral light rays that pass through the imaging optical system 101 according to one embodiment. FIG. 12 illustrates an overview of the passage range of the central light rays and the passage range of the peripheral light rays in the optical phase modulator (the BM 10) of the imaging optical system 101 according to one embodiment.

As illustrated in FIG. 11 and FIG. 12, in the imaging optical system 101, the peripheral light rays eccentrically enter the concentric pattern regions of the BM 10. Therefore, the phase modulation by the BM 10 is not concentric for the peripheral light rays, and the MTF greatly changes as compared with the center. In an eccentric direction, the peak value of the MTF decreases at high frequency. Assuming that an allowable value for the decrease in the peak value of the MTF is a ratio between the central MTF and the peripheral MTF of 70% or more, at a spatial frequency at which the central MTF is 10% or more, this allowable value holds by satisfying the conditional expression (1).

(Allowable Retardation of BM)

It is desirable that the imaging optical system 101 according to one embodiment satisfy the following conditional expression.

$$\lambda/4 * 0.75 < Re < \lambda/4 * 1.1 \quad (2), \text{where}$$

λ: a wavelength of light; and
Re: phase retardation caused by the birefringence of the optical phase modulator (the BM 10).

FIG. 13 illustrates an example of the through-focus MTF for a plurality of spatial frequencies of the imaging optical system 101 according to one embodiment. FIG. 13 illustrates, as a preferable example, the through-focus MTF in a case where the retardation of the BM 10 falls within the range of the conditional expression (2) (Re=λ/4*0.86), and, as an unpreferable example, the through-focus MTF in a case where the retardation falls outside the range of the conditional expression (2) (Re=λ/4*1.1).

The retardation of the BM 10 is optimum within the range of the conditional expression (2). One reason for this is that, if the retardation exceeds the upper limit of the conditional expression (2), focus positions of the X-polarized light and the Y-polarized light are separated too much in a front-back direction, and the through-focus MTF has two peaks depending on the spatial frequency, as illustrated in FIG. 13. In such a state, the focus position is not definable in the first place, which results in difficulty of focusing by electronic calculation, such as AF (autofocus). In addition, if the retardation falls below the lower limit of the conditional expression (2), it is difficult to exert a desired effect of the BM 10. The wavelength is about λ=550 nm in a case of visible light, and λ in the conditional expression (2) is set to any wavelength at which maximum depth extension is desired.

(Desirable Lens to be Applied)

In a case of applying the endoscopic camera head 30 illustrated in FIG. 9 to a rigid endoscope, for example, it is desirable that the imaging optical system 101 be a medium telephoto lens with a focal length of 100 mm or more in 35 mm conversion. Satisfying a conditional expression (3) corresponds to the imaging optical system 101 being such a medium telephoto lens.

$$h/f2 < 0.50 \quad (3), \text{where}$$

h: a maximum image height in a diagonal direction on the imaging plane Sip; and
f2: a focal length of an optical system, of the image-forming optical system 20, on the imaging plane Sip side with respect to the aperture stop St.

(Measures against Flare and Ghost)

FIG. 14 illustrates an overview of occurrence of flare and ghost in an imaging optical system 101A according to one embodiment. FIG. 15 illustrates a configuration example that suppresses occurrence of flare and ghost in an imaging optical system 101B according to one embodiment.

The imaging optical system 101A illustrated in FIG. 14 illustrates, for example, a configuration example to be applied to the endoscopic camera head 30. On the object side of the imaging optical system 101A, an endoscope cover glass 33 and a camera head cover glass 34 are disposed. The camera head cover glass 34 is disposed to be tilted. In the imaging optical system 101A, an optical filter FL and a seal glass SG are disposed on an optical path between the image-forming optical system 20 and the image sensor 100. In the imaging optical system 101A, the flat-shaped BM 10 is disposed perpendicular to an optical axis (not disposed to be tilted). On the other hand, in the imaging optical system 101B illustrated in FIG. 15, the BM 10 is disposed to be tilted. The configuration of the imaging optical system 101B is similar to the imaging optical system 101A, except that the BM 10 is disposed to be tilted.

In a case where a flat plate like the BM 10 is disposed before the image-forming optical system 20, and an optical device, such as the endoscope cover glass 33 and the camera head cover glass 34, is present before or after the BM 10, reflected light Lr reflected off the BM 10 and the optical device before or after the BM 10 can cause flare and ghost, as illustrated in FIG. 14. Particularly in a case where it is not possible to apply AR coating to the BM 10, the reflected light Lr reflected off the BM 10 causes flare and ghost, which can result in a decrease in resolution performance, and misidentification of a subject due to an artifact.

As a measure against this, it is desirable to dispose the BM 10 with such a tilt that lets the reflected light Lr causing ghost and flare out of an angle of view, as illustrated in FIG. 15. In this case, it is desirable that the BM 10 be disposed to be tilted to satisfy the following conditional expression.

$$1 < \theta/w1 < 2 \quad (4), \text{where}$$

w1: an angle of incidence, on the aperture stop St, of a light ray that forms an image at an image height in a short-side direction of the imaging plane Sip; and θ: a tilt angle of the BM 10.

In addition, it is desirable that the BM 10 be disposed to be tilted in a tilt direction that is opposite to a tilt direction of the optical device, such as the camera head cover glass 34, disposed to be tilted on the object side with respect to the BM 10.

(Configuration Example Suitable for Miniaturization)

The imaging optical system 101 to be applied to an endoscope or a surgical microscope is a telephoto lens in many cases. A lens to be used in these applications is preferably small, and it is desirable that the imaging optical system 101 satisfy the following conditional expression.

$$L\_all/f2 < 2.5 \quad (5), \text{ where}$$

L_all: a distance, to the imaging plane Sip, from a surface on the object side of a powered lens farthest on the object side, in an optical system on the imaging plane Sip side with respect to the aperture stop St; and f2: a focal length of the optical system on the imaging plane Sip side with respect to the aperture stop St (see FIG. 11).

In addition, in the imaging optical system 101 to be applied to an endoscope or a surgical microscope, it is preferable that, on the imaging plane Sip side with respect to the aperture stop St, a lens group farthest on the object side have positive power, and a lens group having negative power be disposed next. Thus, a telephoto-type configuration is achieved, making it possible to miniaturize the imaging optical system 101.

(Concerning Vignetting (Vignetting))

FIG. 16 illustrates an example of the passage range of the central light rays and the passage range of the peripheral light rays in the optical phase modulator (the BM 10) in a case where there is vignetting in the imaging optical system 101 according to one embodiment. FIG. 17 illustrates an example of the central light rays and the peripheral light rays in a case where there is vignetting in the imaging optical system 101 according to one embodiment.

As illustrated in FIG. 17, in a case where an aperture Sta other than the aperture stop St is present in the imaging optical system 101, vignetting (Vignetting) occurs particularly for the peripheral light rays. In this case, as illustrated in FIG. 16, the passage range of the peripheral light rays in the BM 10 becomes smaller than the passage range of the central light rays, and the passage range of the peripheral light rays loses circular symmetry. To give the effect of the BM 10 similarly to the central light rays and the peripheral light rays, it is desirable that there is no vignetting for the peripheral light rays. One reason for this is that, if the phase modulation of the BM 10 loses circular symmetry, it is no longer possible to exert intrinsic performance of the BM 10.

Therefore, it is desirable that a structure that blocks a light ray forming an image in an effective image circle of the imaging plane Sip after passing through the aperture stop St not be present between the aperture stop St and the imaging plane Sip. For example, even if the image-forming optical system 20 includes an aperture structure for cutting of flare and ghost other than the aperture stop St, it is desirable that a diameter of the aperture structure be sufficiently larger than an optical effective diameter when the light ray forming an image in the effective image circle passes through the aperture structure.

4. Effects

As described above, in the imaging optical system 101 and the imaging apparatus according to one embodiment, while the predetermined conditions are satisfied, the BM 10 gives the two pupil functions to the image-forming optical system 20. This makes it possible to extend the depth of field while suppressing a decrease in the resolution performance.

The imaging optical system 101 according to one embodiment enables optimum depth of field extension with the resolution performance comparable to that of the normal optical system 102. If an appropriate measure against ghost is taken in the imaging optical system 101 according to one embodiment, it is possible to suppress a decrease in contrast and an adverse effect of a double image or the like, enabling an improvement in the image quality.

In the imaging optical system 101 according to one embodiment, the BM 10 does not include a complicated concavo-convex structure, which makes it possible to provide a depth extension optical system with high medical reliability and manufacturability. It is expectable that using the imaging optical system 101 according to one embodiment for medical imaging equipment enables efficient surgical operation with high precision.

It is to be noted that the effects described in the present specification are merely examples and not limitative, and other effects may be achieved.

EXAMPLES

5. Numerical Examples

Described next are specific numerical examples of the imaging optical system 101 according to one embodiment of the present disclosure. It is to be noted that, in the following, substantially the same portions as the components of the imaging optical system 101 according to one embodiment are denoted with the same reference numerals, and description thereof is omitted as appropriate.

Configuration Common to Examples

Imaging optical systems 1 to 3 according to Examples 1 to 3 below each include the aperture stop St, the BM 10, and the image-forming optical system 20, in order from the object side toward the imaging plane Sip side. On an optical path between the image-forming optical system 20 and the imaging plane Sip, the optical filter FL and the seal glass SG are disposed.

In each of the imaging optical systems 1 and 2 according to Examples 1 and 2, the BM 10 is disposed to be tilted. In the imaging optical system 3 according to Example 3, the BM 10 is not disposed to be tilted. In each of the imaging optical systems 1 to 3 according to Examples 1 to 3, the BM 10 includes the first concentric pattern region A1 and the second concentric pattern region B1.

In each of the imaging optical systems 1 to 3 according to Examples 1 to 3, the image sensor 100 is disposed on the imaging plane Sip. An image captured by the image sensor 100 is subjected to image processing using an inverse transform filter in the image processor 110 (FIG. 6).

Example 1

FIG. 18 schematically illustrates the concentric pattern regions of the BM 10 and the diameter of the aperture stop St in the imaging optical system 1 according to Example 1. FIG. 19 illustrates an overall configuration of the imaging optical system 1 according to Example 1.

In the imaging optical system 1 according to Example 1, the image-forming optical system 20 includes a first lens G1, a second lens G2, a third lens G3, a fourth lens G4, a fifth lens G5, and a sixth lens G6, in order from the object side toward the imaging plane Sip side. The first lens G1 and the second lens G2 are cemented to each other. The fourth lens G4 and the fifth lens G5 are cemented to each other. The cemented lens including the first lens G1 and the second lens G2 is a lens group having positive power. The third lens G3 is a lens group having negative power.

[Table 1] shows basic lens data of the imaging optical system 1 according to Example 1. In [Table 1], "Si" indicates a surface number meaning an i-th surface counted from the object side. The surface number is affixed with an attribute of the surface. For example, "G1R1" indicates a lens surface on the object side of the first lens G1, and "G1R2" indicates a lens surface on the imaging plane Sip side of the first lens G1. Similarly, "G2R1" indicates a lens surface on the object side of the second lens G2, and "G2R2" indicates a lens surface on the imaging plane Sip side of the second lens G2. The same applies to other lens surfaces and optical surfaces. "ri" indicates a curvature radius (unit: mm) of the i-th surface counted from the object side. A portion where the value of "ri" is "∞" indicates the aperture stop St, a flat surface, or a virtual surface. "di" indicates an on-axis surface interval (unit: mm) between the i-th surface and an i+1-th surface counted from the object side. "ndi" indicates a refractive index for the d line (wavelength 587.6 nm) of a glass material or a material having the i-th surface on the object side. "vdi" indicates an Abbe number for the d line of a glass material or a material having the i-th surface on the object side. The same applies to lens data in other Examples below.

In addition, [Table 2] shows values of a focal length (f) of the whole system, an aperture diameter (D) of the aperture stop St (see FIG. 18), an open F-number (Fno), and an image height (IH) in the imaging optical system 1 according to Example 1. In addition, [Table 2] shows values of a radius (Ring1) of the first concentric pattern region A1 (see FIG. 18), a radius (Ring2) of the second concentric pattern region B1 (see FIG. 18), and retardation (Re) of the optical phase modulator (the BM 10).

TABLE 1

Example 1

| Si | ri | di | ndi | vdi |
|---|---|---|---|---|
| 1(St) | ∞ | 1 | | |
| 2(BMR1) | ∞ | 1.1 | 1.51872 | 64.17 |
| 3(BMR2) | ∞ | 0.5 | | |
| 4(G1R1) | 7.554 | 1.322 | 1.7231 | 29.50 |
| 5(G1R2, G2R1) | 7.165 | 2.052 | 1.62032 | 63.39 |
| 6(G2R2) | −52.637 | 2.455 | | |
| 7(G3R1) | −8.720 | 0.683 | 1.67764 | 32.17 |
| 8(G3R2) | 7.082 | 2.704 | | |
| 9(G4R1) | −55.883 | 0.683 | 1.67764 | 32.17 |
| 10(G4R2, G5R1) | 9.502 | 2.869 | 1.83945 | 42.72 |
| 11(G5R2) | −16.791 | 3.902 | | |
| 12(G6R1) | 22.295 | 2.014 | 1.73234 | 54.67 |
| 13(G6R2) | −42.420 | 3.121 | | |
| 14(FLR1) | ∞ | 1.000 | 1.51872 | 64.20 |
| 15(FLR2) | ∞ | 4.500 | | |
| 16(SGR1) | ∞ | 0.500 | 1.51872 | 64.20 |
| 17(SGR2) | ∞ | 0.894 | | |
| 18(Sip) | ∞ | | | |

TABLE 2

| Example 1 | |
|---|---|
| f(mm) | 20 |
| D(mm) | 4 |
| Fno | 5 |
| IH(mm) | 3.6 |
| Ring1(mm) | 0.677 |
| Ring2(mm) | 1.563 |
| Re(nm) | 119.7 |

FIG. 20 illustrates the through-focus MTF of the imaging optical system 1 according to Example 1. FIG. 20 illustrates the through-focus MTF related to the spatial frequency (100 (Lp/mm)) at which the BM 10 exerts the strongest influence. FIG. 20 illustrates, as the through-focus MTF of the imaging optical system 1 according to Example 1, characteristics in a case where image processing has not been performed (with depth extension (without image processing)), and characteristics in a case where the image processing using the inverse transform filter has been performed (with depth extension (with image processing)). In addition, FIG. 20 illustrates, as Comparative Example, the through-focus MTF of an optical system not including the BM 10 (without depth extension).

As illustrated in FIG. 20, in the case where image processing has not been performed, the imaging optical system 1 according to Example 1 exhibits a great decrease in the peak of the through-focus MTF, as compared with the optical system not including the BM 10. However, the use of the inverse transform filter to apply ideal deconvolution processing for recovery of the same resolution as the optical system not including the BM 10 has made it possible to return the peak of the through-focus MTF to a peak equivalent to that of the optical system not including the BM 10, and to greatly extend the depth.

FIG. 21 illustrates the frequency characteristics of the MTF at the focus position of the imaging optical system 1 according to Example 1. FIG. 21 illustrates, with a solid line, characteristics in the case where image processing has not been performed (with depth extension (without image processing)), as the frequency characteristics of the MTF of the imaging optical system 1 according to Example 1. In addition, FIG. 21 illustrates, as Comparative Example, the frequency characteristics of the MTF of the optical system not including the BM 10 (without depth extension). In addition, FIG. 21 illustrates the frequency characteristics of the inverse transform filter to be used to apply the ideal deconvolution processing for recovery of the same resolution as the optical system not including the BM 10. The same applies to the frequency characteristics of the MTF in other Examples below.

As illustrated in FIG. 21, in the case where image processing has not been performed, the imaging optical system 1 according to Example 1 exhibits a decrease in the frequency characteristics of the MTF, as compared with the optical system not including the BM 10. However, the use of the inverse transform filter to apply the ideal deconvolution processing for recovery of the same resolution as the optical system not including the BM 10 has made it possible to return the frequency characteristics of the MTF to frequency characteristics substantially equivalent to those of the optical system not including the BM 10.

Example 2

FIG. 22 schematically illustrates the concentric pattern regions of the BM 10 and the diameter of the aperture stop St in the imaging optical system 2 according to Example 2. FIG. 23 illustrates an overall configuration of the imaging optical system 2 according to Example 2.

The imaging optical system 2 according to Example 2 has substantially the same configuration as the imaging optical system 1 according to Example 1, but the aperture diameter (D) of the aperture stop St is varied from that in the imaging optical system 1 according to Example 1. The imaging optical system 2 according to Example 2 indicates that changing the aperture diameter of the aperture stop St result in a change in the effect of the depth extension. [Table 3] shows basic lens data of the imaging optical system 2 according to Example 2. In addition, [Table 4] shows values of a focal length (f) of the whole system, an aperture diameter (D) of the aperture stop St (see FIG. 22), an open F-number (Fno), and an image height (IH) in the imaging optical system 2 according to Example 2. In addition, [Table 4] shows values of a radius (Ring1) of the first concentric pattern region A1 (see FIG. 22), a radius (Ring2) of the second concentric pattern region B1 (see FIG. 22), and retardation (Re) of the optical phase modulator (the BM 10).

TABLE 3

Example 2

| Si | ri | di | ndi | vdi |
|---|---|---|---|---|
| 1(St) | ∞ | 1 | | |
| 2(BMR1) | ∞ | 1.1 | 1.51872 | 64.17 |
| 3(BMR2) | ∞ | 0.5 | | |
| 4(G1R1) | 7.554 | 1.322 | 1.7231 | 29.50 |
| 5(G1R2, G2R1) | 7.165 | 2.052 | 1.62032 | 63.39 |
| 6(G2R2) | −52.637 | 2.455 | | |
| 7(G3R1) | −8.720 | 0.683 | 1.67764 | 32.17 |
| 8(G3R2) | 7.082 | 2.704 | | |
| 9(G4R1) | −55.883 | 0.683 | 1.67764 | 32.17 |
| 10(G4R2, G5R1) | 9.502 | 2.869 | 1.83945 | 42.72 |
| 11(G5R2) | −16.791 | 3.902 | | |
| 12(G6R1) | 22.295 | 2.014 | 1.73234 | 54.67 |
| 13(G6R2) | −42.420 | 3.121 | | |
| 14(FLR1) | ∞ | 1.000 | 1.51872 | 64.20 |
| 15(FLR2) | ∞ | 4.500 | | |
| 16(SGR1) | ∞ | 0.500 | 1.51872 | 64.20 |
| 17(SGR2) | ∞ | 0.894 | | |
| 18(Sip) | ∞ | | | |

TABLE 4

Example 2

| f(mm) | 20 |
|---|---|
| D(mm) | 2.4 |
| Fno | 8.33 |
| IH(mm) | 3.6 |
| Ring1(mm) | 0.677 |
| Ring2(mm) | 1.563 |
| Re(nm) | 119.7 |

FIG. 24 illustrates the through-focus MTF of the imaging optical system 2 according to Example 2. FIG. 24 illustrates the through-focus MTF related to the spatial frequency (100 (Lp/mm)) at which the BM 10 exerts the strongest influence. FIG. 24 illustrates, as the through-focus MTF of the imaging optical system 2 according to Example 2, characteristics in a case where image processing has not been performed (with depth extension (without image processing)), and characteristics in a case where the image processing using the inverse transform filter has been performed (with depth extension (with image processing)). In addition, FIG. 24 illustrates, as Comparative Example, the through-focus MTF of an optical system not including the BM 10 (without depth extension). As illustrated in FIG. 24, in the case where image processing has not been performed, the imaging optical system 2 according to Example 2 exhibits a great decrease in the peak of the through-focus MTF, as compared with the optical system not including the BM 10. However, the use of the inverse transform filter to apply ideal deconvolution processing for recovery of the same resolution as the optical system not including the BM 10 has made it possible to return the peak of the through-focus MTF to a peak equivalent to that of the optical system not including the BM 10, and to greatly extend the depth.

FIG. 25 illustrates the frequency characteristics of the MTF at the focus position of the imaging optical system 2 according to Example 2. As illustrated in FIG. 25, in the case where image processing has not been performed, the imaging optical system 2 according to Example 2 exhibits a decrease in the frequency characteristics of the MTF, as compared with the optical system not including the BM 10. However, the use of the inverse transform filter to apply the ideal deconvolution processing for recovery of the same resolution as the optical system not including the BM 10 has made it possible to return the frequency characteristics of the MTF to frequency characteristics substantially equivalent to those of the optical system not including the BM 10.

Example 3

FIG. 26 schematically illustrates the concentric pattern regions of the optical phase modulator (the BM 10) and the diameter of the aperture stop St in the imaging optical system 3 according to Example 3.

FIG. 27 illustrates a configuration of the imaging optical system 3 according to Example 3.

In the imaging optical system 3 according to Example 3, the image-forming optical system 20 includes a first lens G1, a second lens G2, a third lens G3, a fourth lens G4, and a fifth lens G5, in order from the object side toward the imaging plane Sip side. Each lens is a single lens. The first lens G1 is a lens group having positive power. The second lens G2 is a lens group having negative power.

[Table 5] shows basic lens data of the imaging optical system 3 according to Example 3. In addition, [Table 6] shows values of a focal length (f) of the whole system, an aperture diameter (D) of the aperture stop St (see FIG. 26), an open F-number (Fno), and an image height (IH) in the imaging optical system 3 according to Example 3. In addition, [Table 6] shows values of a radius (Ring1) of the first concentric pattern region (see FIG. 26), a radius (Ring2) of the second concentric pattern region (see FIG. 26), and retardation (Re) of the optical phase modulator (the BM 10).

TABLE 5

Example 3

| Si | ri | di | ndi | vdi |
|---|---|---|---|---|
| 1(St) | ∞ | 0.02 | | |
| 2(BMR1) | ∞ | 1.1 | 1.5168 | 64.1664 |
| 3(BMR2) | ∞ | 0.5 | | |
| 4(G1R1) | 5.766 | 2.948 | 1.72916 | 54.6727 |
| 5(G1R2) | −10.279 | 0.444 | | |
| 6(G2R1) | −6.207 | 0.700 | 1.64769 | 33.84 |
| 7(G2R2) | 5.158 | 4.036 | | |
| 8(G3R1) | 31.485 | 1.906 | 1.83481 | 42.7208 |
| 9(G3R2) | −12.249 | 3.022 | | |
| 10(G4R1) | −5.500 | 0.600 | 1.62004 | 36.3 |
| 11(G4R2) | −64.086 | 0.300 | | |

TABLE 5-continued

Example 3

| Si | ri | di | ndi | vdi |
|---|---|---|---|---|
| 12(G5R1) | −38.253 | 1.591 | 1.72916 | 54.6727 |
| 13(G5R2) | −7.424 | 1.000 | | |
| 14(FLR1) | ∞ | 0.500 | 1.5168 | 64.1973 |
| 15(FLR2) | ∞ | 1.000 | | |
| 16(SGR1) | ∞ | 0.500 | 1.5168 | 64.1973 |
| 17(SGR2) | ∞ | 0.746 | | |
| 18(Sip) | ∞ | | | |

TABLE 6

Example 3

| f(mm) | 16 |
|---|---|
| D(mm) | 1.5 |
| Fno | 10.67 |
| IH(mm) | 2.5 |
| Ring1(mm) | 0.259 |
| Ring2(mm) | 0.580 |
| Re(nm) | 119.7 |

FIG. 28 illustrates the through-focus MTF of the imaging optical system 3 according to Example 3. FIG. 28 illustrates the through-focus MTF related to the spatial frequency (40 (Lp/mm)) at which the BM 10 exerts the strongest influence. FIG. 28 illustrates, as the through-focus MTF of the imaging optical system 3 according to Example 3, characteristics in a case where image processing has not been performed (with depth extension (without image processing)), and characteristics in a case where the image processing using the inverse transform filter has been performed (with depth extension (with image processing)). In addition, FIG. 28 illustrates, as Comparative Example, the through-focus MTF of an optical system not including the BM 10 (without depth extension). As illustrated in FIG. 28, in the case where image processing has not been performed, the imaging optical system 3 according to Example 3 exhibits a great decrease in the peak of the through-focus MTF, as compared with the optical system not including the BM 10. However, the use of the inverse transform filter to apply ideal deconvolution processing for recovery of the same resolution as the optical system not including the BM 10 has made it possible to return the peak of the through-focus MTF to a peak equivalent to that of the optical system not including the BM 10, and to greatly extend the depth.

FIG. 29 illustrates the frequency characteristics of the MTF at the focus position of the imaging optical system 3 according to Example 3. As illustrated in FIG. 29, in the case where image processing has not been performed, the imaging optical system 3 according to Example 3 exhibits a decrease in the frequency characteristics of the MTF, as compared with the optical system not including the BM 10. However, the use of the inverse transform filter to apply the ideal deconvolution processing for recovery of the same resolution as the optical system not including the BM 10 has made it possible to return the frequency characteristics of the MTF to frequency characteristics substantially equivalent to those of the optical system not including the BM 10.

Other Numerical Data of Examples

[Table 7] summarizes, for each of Examples, values related to the conditional expressions given above. It is apparent from [Table 7] that Examples 1 and 2 satisfy the conditional expressions. Example 3 satisfy the conditional expressions except for the conditional expression (4).

TABLE 7

| | | Example | | |
|---|---|---|---|---|
| Conditional expression | | 1 | 2 | 3 |
| (1) | L(mm) | 1 | 1 | 0.02 |
| | w(°) | 10.204 | 10.204 | 8.881 |
| | D(mm) | 4 | 2.4 | 1.5 |
| | (2 × L × tan(w) + D)/D | 1.090 | 1.150 | 1.004 |
| (2) | λ(nm) | 550 | 550 | 550 |
| | Re(nm) | 119.7 | 119.7 | 119.7 |
| (3) | h/f2 | 0.18 | 0.18 | 0.156 |
| (4) | Imaging plane short-side length(mm) | 1.76 | 1.76 | 1.77 |
| | θ(°) | 9.00 | 9.00 | 0 |
| | w1(°) | 5.04 | 5.04 | 6.30 |
| | θ/w1 | 1.78 | 1.78 | 0 |
| (5) | L_all/f2 | 1.435 | 1.435 | 1.206 |

6. Other Embodiments

The technology according to the present disclosure is not limited to the description of the embodiments and Examples described above, and various modifications may be made.

For example, the shapes and numerical values of the respective parts described above in Examples are mere examples of the implementation of the present technology, and the technical scope of the present technology should not be construed as being limited by these examples.

For example, the present technology may have the following configurations.

According to the present technology having the following configurations, while the predetermined conditions are satisfied, the optical phase modulator gives the two pupil functions to the image-forming optical system. This makes it possible to extend the depth of field while suppressing a decrease in the resolution performance.

[1]

An imaging optical system including:

an aperture stop;

an image-forming optical system that causes an image to be formed toward an imaging plane of an image sensor; and an optical phase modulator that includes a substance having a birefringence index, and gives two pupil functions to the image-forming optical system, in which the following conditional expressions are satisfied:

$$1 \leq (2 \times L \times \tan(w) + D)/D < 1.4 \quad (1)$$

$$\lambda/4 * 0.75 < Re < \lambda/4 * 1.1 \quad (2), \text{where}$$

L: a distance between the aperture stop and the optical phase modulator;

D: an aperture diameter (diameter) of the aperture stop;

w: a maximum angle of incidence of a principal light ray that enters the aperture stop;

λ: a wavelength of light; and

Re: phase retardation caused by birefringence of the optical phase modulator.

[2]

The imaging optical system according to [1], in which the optical phase modulator applies respective different phase modulations to two pieces of polarized light in an orthogonal relationship.

[3]

The imaging optical system according to [1] or [2], in which the image-forming optical system satisfies the following conditional expression:

$$h/f2<0.50 \quad (3),$$ where h: a maximum image height in a diagonal direction on the imaging plane; and f2: a focal length of an optical system, of the image-forming optical system, on the imaging plane side with respect to the aperture stop.

[4]

The imaging optical system according to any one of [1] to [3], in which the optical phase modulator includes an optical device having no refractive power, and includes an optical device substrate and a birefringent layer formed on a surface of the optical device substrate, and the birefringent layer includes at least two or more concentric pattern regions for phase modulation application, and a relative angle of birefringence anisotropy between adjacent two of the concentric pattern regions is 90°.

[5]

The imaging optical system according to any one of [1] to [3], in which the optical phase modulator includes an optical device having no refractive power, and includes two optical device substrates and a birefringent layer formed between the two optical device substrates, and the birefringent layer includes at least two or more concentric pattern regions for phase modulation application, and a relative angle of birefringence anisotropy between adjacent two of the concentric pattern regions is 90°.

[6]

The imaging optical system according to any one of [1] to [5], in which an image captured by the image sensor is subjected to image processing using deconvolution derived from a point spread function.

[7]

The imaging optical system according to any one of [1] to [6], in which the optical phase modulator is disposed to be tilted to satisfy the following conditional expression:

where w1: an angle of incidence, on the aperture stop, of a light ray that forms an image at an image height in a short-side direction of the imaging plane; and θ: a tilt angle of the optical phase modulator.

[8]

The imaging optical system according to [7], in which the optical phase modulator is disposed to be tilted in a tilt direction that is opposite to a tilt direction of an optical device disposed to be tilted on an object side with respect to the optical phase modulator.

[9]

The imaging optical system according to any one of [1] to [8], in which the optical phase modulator has an effect of extending a depth of field of the image-forming optical system.

[10]

The imaging optical system according to any one of [1] to [9], in which a structure that blocks a light ray forming an image in an effective image circle of the imaging plane after passing through the aperture stop is not present between the aperture stop and the imaging plane.

[11]

The imaging optical system according to any one of [1] to [10], in which the image-forming optical system includes, on the imaging plane side with respect to the aperture stop, a lens group having positive power and located farthest on an object side, and a lens group having negative power and located second farthest on the object side.

[12]

The imaging optical system according to any one of [1] to [11], in which the following conditional expression is satisfied:

$$L\_all/f2<2.5 \quad (5),$$ where

L_all: a distance, to the imaging plane, from a surface on an object side of a powered lens disposed farthest on the object side, in an optical system on the imaging plane side with respect to the aperture stop; and f2: a focal length of the optical system on the imaging plane side with respect to the aperture stop.

[13]

The imaging optical system according to any one of [1] to [12], in which the imaging optical system is configured as an optical system for capturing of an image formed by an afocal optical system.

[14]

The imaging optical system according to any one of [1] to [13], in which the imaging optical system is configured as an optical system for imaging of an affected area via a surgical microscope.

[15]

The imaging optical system according to any one of [1] to [13], in which the imaging optical system is configured as an optical system for a camera head of a rigid endoscope.

[16]

The imaging optical system according to any one of [1] to [13], in which the imaging optical system is configured as an optical system for a camera head of an endoscope including a fiber scope.

[17]

An imaging apparatus including:

an imaging optical system; and an image sensor disposed at a position of image formation by the imaging optical system, in which the imaging optical system includes an aperture stop, an image-forming optical system that causes an image to be formed toward an imaging plane of the image sensor, and an optical phase modulator that includes a substance having a birefringence index, and gives two pupil functions to the image-forming optical system, and the following conditional expressions are satisfied:

$$1 \leq (2 \times L \times \tan(w)+D)/D < 1.4 \quad (1)$$

$$\lambda/4*0.75 < Re < \lambda/4*1.1 \quad (2),$$ where

L: a distance between the aperture stop and the optical phase modulator;

D: an aperture diameter (diameter) of the aperture stop;

w: a maximum angle of incidence of a principal light ray that enters the aperture stop;

λ: a wavelength of light; and

Re: phase retardation caused by birefringence of the optical phase modulator.

[18]

The imaging apparatus according to [17], further including an image processor that performs, on an image captured by the image sensor, image processing using deconvolution derived from a point spread function.

This application claims the benefit of Japanese Priority Patent Application No. 2019-174200 filed with the Japan Patent Office on Sep. 25, 2019, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging optical system comprising:
an aperture stop;
an image-forming optical system that causes an image to be formed toward an imaging plane of an image sensor; and
an optical phase modulator that includes a substance having a birefringence index, and gives two pupil functions to the image-forming optical system, wherein the following conditional expressions are satisfied:

$$1 \leq (2 \times L \times \tan(w) + D)/D < 1.4 \quad (1)$$

$$\lambda/4 * 0.75 < Re < \lambda/4 * 1.1 \quad (2), \text{where}$$

L: a distance between the aperture stop and the optical phase modulator;
D: an aperture diameter (diameter) of the aperture stop;
w: a maximum angle of incidence of a principal light ray that enters the aperture stop;
λ: a wavelength of light; and
Re: phase retardation caused by birefringence of the optical phase modulator.

2. The imaging optical system according to claim 1, wherein the optical phase modulator applies respective different phase modulations to two pieces of polarized light in an orthogonal relationship.

3. The imaging optical system according to claim 1, wherein the image-forming optical system satisfies the following conditional expression:

$$h/f2 < 0.50 \quad (3), \text{where}$$

h: a maximum image height in a diagonal direction on the imaging plane; and
f2: a focal length of an optical system, of the image-forming optical system, on the imaging plane side with respect to the aperture stop.

4. The imaging optical system according to claim 1, wherein
the optical phase modulator
comprises an optical device having no refractive power, and
includes an optical device substrate and a birefringent layer formed on a surface of the optical device substrate, and
the birefringent layer includes at least two or more concentric pattern regions for phase modulation application, and a relative angle of birefringence anisotropy between adjacent two of the concentric pattern regions is 90°.

5. The imaging optical system according to claim 1, wherein
the optical phase modulator
comprises an optical device having no refractive power, and
includes two optical device substrates and a birefringent layer formed between the two optical device substrates, and
the birefringent layer includes at least two or more concentric pattern regions for phase modulation application, and a relative angle of birefringence anisotropy between adjacent two of the concentric pattern regions is 90°.

6. The imaging optical system according to claim 1, wherein an image captured by the image sensor is subjected to image processing using deconvolution derived from a point spread function.

7. The imaging optical system according to claim 1, wherein the optical phase modulator is disposed to be tilted to satisfy the following conditional expression:

$$1 < \theta/w1 < 2 \quad (4), \text{where}$$

w1: an angle of incidence, on the aperture stop, of a light ray that forms an image at an image height in a short-side direction of the imaging plane; and
θ: a tilt angle of the optical phase modulator.

8. The imaging optical system according to claim 7, wherein the optical phase modulator is disposed to be tilted in a tilt direction that is opposite to a tilt direction of an optical device disposed to be tilted on an object side with respect to the optical phase modulator.

9. The imaging optical system according to claim 1, wherein the optical phase modulator has an effect of extending a depth of field of the image-forming optical system.

10. The imaging optical system according to claim 1, wherein a structure that blocks a light ray forming an image in an effective image circle of the imaging plane after passing through the aperture stop is not present between the aperture stop and the imaging plane.

11. The imaging optical system according to claim 1, wherein the image-forming optical system includes, on the imaging plane side with respect to the aperture stop, a lens group having positive power and located farthest on an object side, and a lens group having negative power and located second farthest on the object side.

12. The imaging optical system according to claim 1, wherein the following conditional expression is satisfied:

$$L\_all/f2 < 2.5 \quad (5), \text{where}$$

L_all: a distance, to the imaging plane, from a surface on an object side of a powered lens disposed farthest on the object side, in an optical system on the imaging plane side with respect to the aperture stop; and
f2: a focal length of the optical system on the imaging plane side with respect to the aperture stop.

13. The imaging optical system according to claim 1, wherein the imaging optical system is configured as an optical system for capturing of an image formed by an afocal optical system.

14. The imaging optical system according to claim 1, wherein the imaging optical system is configured as an optical system for imaging of an affected area via a surgical microscope.

15. The imaging optical system according to claim 1, wherein the imaging optical system is configured as an optical system for a camera head of a rigid endoscope.

16. The imaging optical system according to claim 1, wherein the imaging optical system is configured as an optical system for a camera head of an endoscope including a fiber scope.

17. An imaging apparatus comprising:
an imaging optical system; and
an image sensor disposed at a position of image formation by the imaging optical system, wherein
the imaging optical system includes
    an aperture stop,
    an image-forming optical system that causes an image to be formed toward an imaging plane of the image sensor, and
    an optical phase modulator that includes a substance having a birefringence index, and gives two pupil functions to the image-forming optical system, and
the following conditional expressions are satisfied:

$$1 \leq (2 \times L \times \tan(w) + D)/D < 1.4 \quad (1)$$

$$\lambda/4 * 0.75 < Re < \lambda/4 * 1.1 \quad (2), \text{ where}$$

L: a distance between the aperture stop and the optical phase modulator;
D: an aperture diameter (diameter) of the aperture stop;
w: a maximum angle of incidence of a principal light ray that enters the aperture stop;
$\lambda$: a wavelength of light; and
Re: phase retardation caused by birefringence of the optical phase modulator.

18. The imaging apparatus according to claim 17, further comprising an image processor that performs, on an image captured by the image sensor, image processing using deconvolution derived from a point spread function.

* * * * *